(12) United States Patent
Diankov

(10) Patent No.: US 10,569,417 B1
(45) Date of Patent: *Feb. 25, 2020

(54) ROBOTIC SYSTEM WITH ENHANCED SCANNING MECHANISM

(71) Applicant: MUJIN, Inc., Tokyo (JP)

(72) Inventor: Rosen Nikolaev Diankov, Tokyo (JP)

(73) Assignee: MUJIN, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/546,236

(22) Filed: Aug. 20, 2019

Related U.S. Application Data

(63) Continuation of application No. 16/258,120, filed on Jan. 25, 2019.

(51) Int. Cl.
| | |
|---|---|
| *G06F 19/00* | (2018.01) |
| *B25J 9/16* | (2006.01) |
| *G06T 7/73* | (2017.01) |
| *G01S 17/89* | (2020.01) |

(52) U.S. Cl.
CPC .......... *B25J 9/1664* (2013.01); *B25J 9/1661* (2013.01); *B25J 9/1697* (2013.01); *G01S 17/89* (2013.01); *G06T 7/73* (2017.01)

(58) Field of Classification Search
CPC ...... B25J 9/1664; B25J 9/1661; B25J 9/1697; G01S 17/89; G06T 7/73
See application file for complete search history.

(56) References Cited

U.S. PATENT DOCUMENTS

| | | | | |
|---|---|---|---|---|
| 4,831,549 | A * | 5/1989 | Red | B25J 9/1692 700/254 |
| 5,789,890 | A * | 8/1998 | Genov | B25J 9/1615 318/567 |
| 2004/0093119 | A1* | 5/2004 | Gunnarsson | B25J 9/1638 700/245 |
| 2004/0167667 | A1* | 8/2004 | Goncalves | G01C 21/12 700/245 |
| 2005/0182518 | A1* | 8/2005 | Karlsson | G05D 1/0246 700/253 |
| 2006/0181236 | A1* | 8/2006 | Brogardh | B25J 9/1671 318/568.1 |
| 2011/0153076 | A1* | 6/2011 | Noro | B25J 9/1687 700/245 |

(Continued)

OTHER PUBLICATIONS

U.S. Patent Office Non-Final Office Action dated Apr. 4, 2019 for U.S. Appl. No. 16/258,120, filed Jan. 25, 2019, 18 pages.

(Continued)

*Primary Examiner* — Ian Jen
(74) *Attorney, Agent, or Firm* — Perkins Coie LLP

(57) ABSTRACT

A method for operating a robotic system including determining an initial pose of a target object based on imaging data, wherein the initial pose is for estimating a resting orientation of the target object in a pickup area; calculating a confidence measure associated with the initial pose, wherein the confidence measure is for representing a likelihood of the initial pose being correct; and calculating a motion plan according to the confidence measure, the motion plan for executing a task based on picking up the target object from a start location, transferring the target object to a task location, and scanning one or more object identifiers between the start location and the task location.

20 Claims, 6 Drawing Sheets

(56) References Cited

U.S. PATENT DOCUMENTS

| | | | | |
|---|---|---|---|---|
| 2014/0347473 | A1* | 11/2014 | Wolff | G06K 9/3233 348/135 |
| 2015/0352717 | A1* | 12/2015 | Mundt | B25J 9/1664 414/730 |
| 2016/0297068 | A1* | 10/2016 | Thibodeau | G05B 19/408 |
| 2016/0379370 | A1* | 12/2016 | Nakazato | G01B 11/24 382/103 |
| 2017/0165836 | A1* | 6/2017 | Kanazawa | B25J 9/1669 |
| 2017/0326739 | A1* | 11/2017 | Nakazato | G01B 11/002 |
| 2017/0364076 | A1* | 12/2017 | Keshmiri | G05B 19/042 |

OTHER PUBLICATIONS

U.S. Patent Office Notice of Allowance dated Jul. 29, 2019 for U.S. Appl. No. 16/258,120, filed Jan. 25, 2019, 6 pages.

U.S. Appl. No. 16/258,120, filed Jan. 25, 2019, Inventor: Rosen Nikolaev Diankov, Applicant: MUJIN, Inc., and titled Robotic System With Enhanced Scanning Mechanism.

U.S. Patent Office Applicant-Initiated Interview Summary dated Aug. 21, 2019 for U.S. Appl. No. 16/258,120, filed Jan. 25, 2019, 3 pages.

U.S. Appl. No. 16/546,209, filed Aug. 20, 2019, Inventor: Rosen Nikolaev Diankov, Applicant: MUJIN, Inc., and titled Robotic System With Enhanced Scanning Mechanism.

U.S. Appl. No. 16/546,226, filed Aug. 20, 2019, Inventor: Rosen Nikolaev Diankov, Applicant: MUJIN, Inc., and titled Robotic System With Enhanced Scanning Mechanism.

U.S. Appl. No. 16/546,248, filed Aug. 20, 2019, Inventor: Rosen Nikolaev Diankov, Applicant: MUJIN, Inc., and titled Robotic System With Enhanced Scanning Mechanism.

U.S. Patent Office Examiner-Initiated Interview Summary dated Sep. 23, 2019 for U.S. Appl. No. 16/546,248, filed Aug. 20, 2019, 2 pages.

* cited by examiner

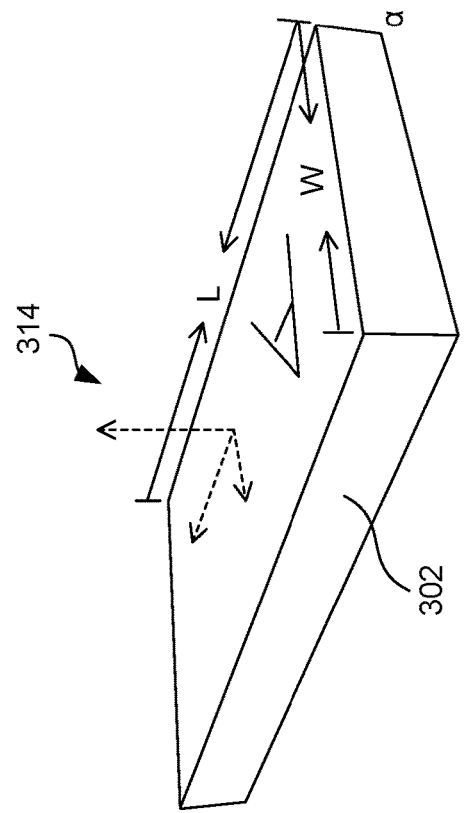
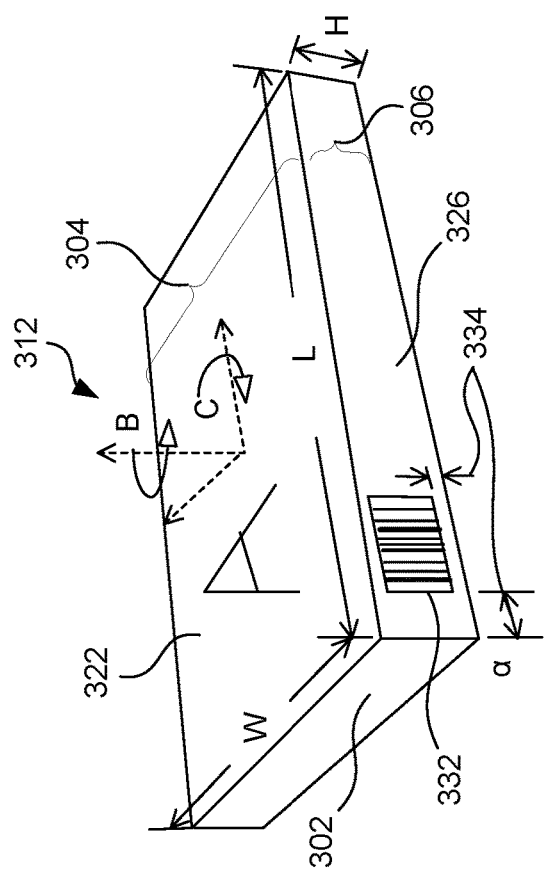
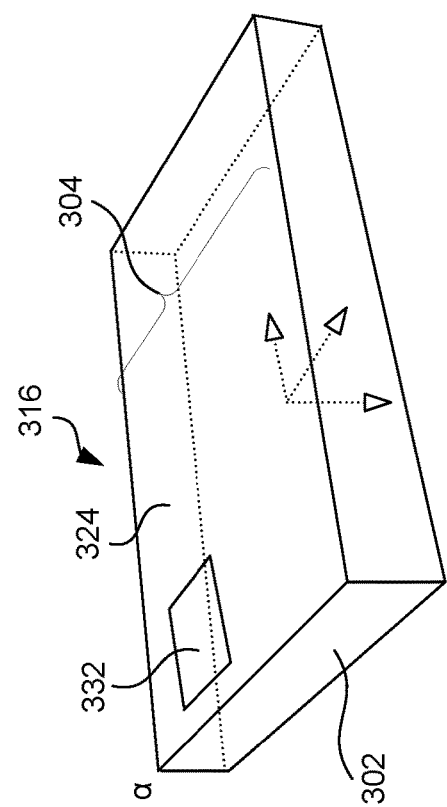
FIG. 3A
FIG. 3B
FIG. 3C

ROBOTIC SYSTEM WITH ENHANCED SCANNING MECHANISM

CROSS-REFERENCE TO RELATED APPLICATIONS

This application is a continuation of, and claims the benefit of, U.S. patent application Ser. No. 16/258,120, filed Jan. 25, 2019, which is incorporated by reference herein in its entirety.

This application contains subject matter related to U.S. patent application Ser. No. 16/546,209, filed Aug. 20, 2019, U.S. patent application Ser. No. 16/546,226, filed Aug. 20, 2019, and U.S. patent application Ser. No. 16/546,248, filed Aug. 20, 2019, all titled "A ROBOTIC SYSTEM WITH ENHANCED SCANNING MECHANISM," and, each incorporated herein by reference in their entireties.

TECHNICAL FIELD

The present disclosure is directed generally to robotic systems and, more specifically, to systems, processes, and techniques for scanning objects.

BACKGROUND

With their ever-increasing performance and lowering cost, many robots (e.g., machines configured to automatically/autonomously execute physical actions) are now extensively used in many fields. Robots, for example, can be used to execute various tasks (e.g., manipulate or transfer an object through space) in manufacturing and/or assembly, packing and/or packaging, transport and/or shipping, etc. In executing the tasks, the robots can replicate human actions, thereby replacing or reducing the human involvement that would otherwise be required to perform dangerous or repetitive tasks.

However, despite the technological advancements, robots often lack the sophistication necessary to duplicate human sensitivity and/or adaptability required for executing more complex tasks. For example, manipulation robots often lack the granularity of control and flexibility in the executed actions to account for deviations or uncertainties that may result from various real-world factors. Accordingly, there remains a need for improved techniques and systems for controlling and managing various aspects of the robots to complete the tasks despite the various real-world factors.

BRIEF DESCRIPTION OF THE DRAWINGS

FIG. 3A is an illustration of an object in a first pose.

FIG. 3B is an illustration of the object of FIG. 3A in a second pose.

FIG. 3C is an illustration of the object of FIG. 3A in a third pose.

DETAILED DESCRIPTION

Figure 1:
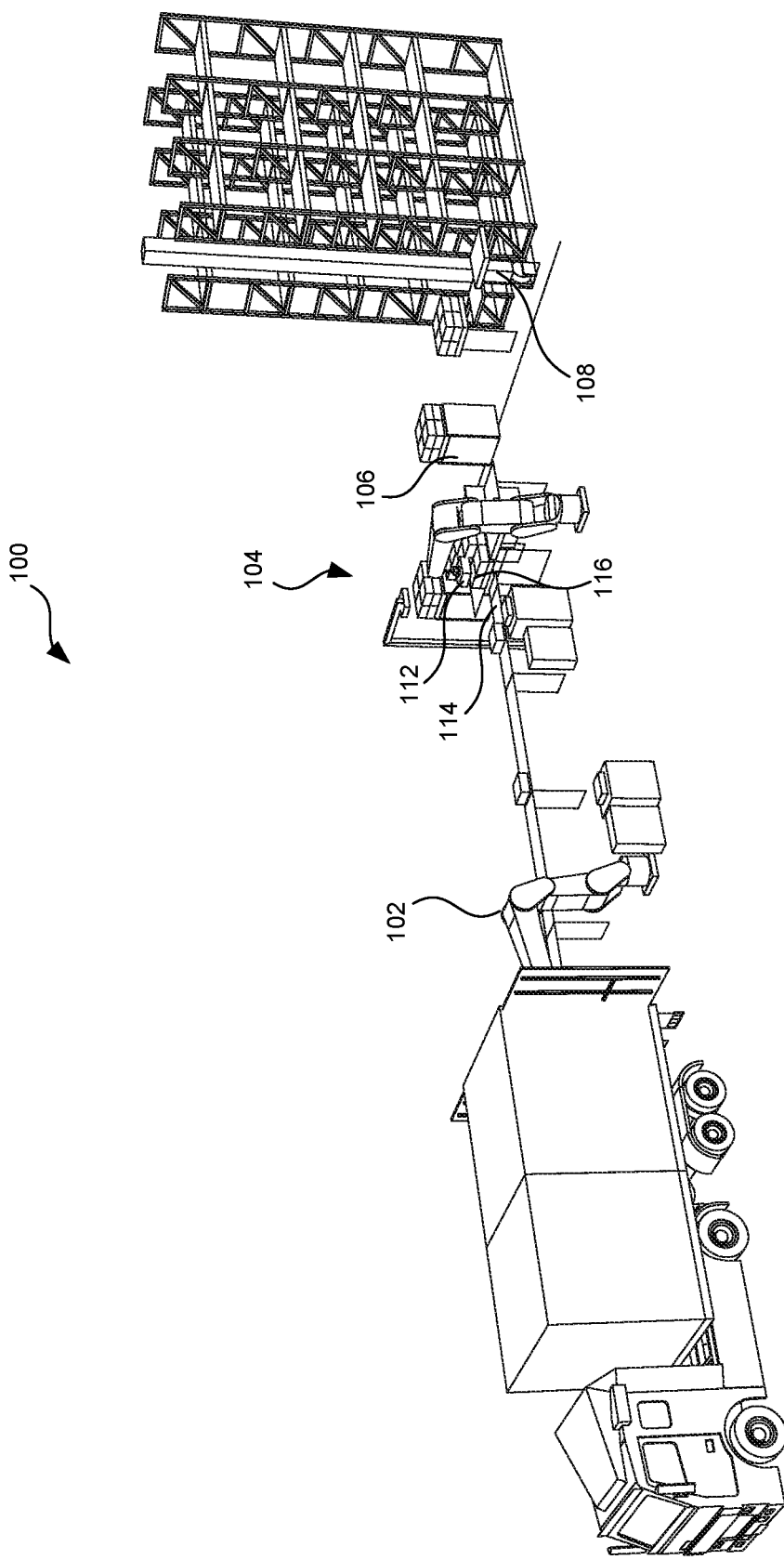
FIG. 1 is an illustration of an example environment in which a robotic system with an enhanced scanning mechanism may operate.

Systems and methods for a robotic system with an enhanced scanning mechanism are described herein. The robotic system (e.g., an integrated system of devices that executes one or more designated tasks) configured in accordance with some embodiments provides enhanced scanning by deriving and executing motion plans according to uncertainties associated with initial poses of objects.

The robotic system can be configured to execute a task based on manipulating (e.g., physically displacing and/or reorienting) a target object. For example, the robotic system can sort or relocate various objects based on picking the target object from a source location (e.g., a bin, a pallet, or a conveyer belt) and moving it to a destination location. In some embodiments, the task can further include scanning the target object during transfer, such as by presenting one or more identifiers (e.g., barcodes or quick response (QR) codes) located on one or more specific locations and/or surfaces of the target object to a set of scanners. Accordingly, the robotic system can derive or calculate a motion plan to grip and pick up the target object, transfer the target object to a presentation location/orientation to present the identifiers to the scanners, and place the target object at a task location (e.g., by transferring the object to the task location, adjusting the pose of the object, lowering the object, and/or releasing the object).

To execute the task, in some embodiments, the robotic system can include an imaging device (e.g., a camera, an infrared sensor/camera, a radar, a lidar, etc.) used to identify a location and a pose (e.g., a resting orientation) of the target object and/or the environment around the target object. In some embodiments, the robotic system can further calculate a confidence measure associated with the pose. The confidence measure can represent a measure of certainty or likelihood that the determined pose matches the actual real-world pose of the target object. For illustrative example, the robotic system can obtain images (e.g., images of a pickup area, such as a source bin or pallet) that depict locations and orientations of objects that are tasked to be transferred from a pickup area to a task area (e.g., destination bin or pallet). The robotic system can process the images to identify or select the target object according to a predetermined order (e.g., from top to bottom and/or from an outer edge and inward). The robotic system can further determine the initial pose from the image, such as by identifying and grouping object lines (e.g., according to pixel color, brightness, and/or change in values thereof relative to adjacent pixels). In determining the initial pose, the robotic system can further calculate the confidence measure (e.g., a quantified degree of certainty associated with the determined pose) according to a predetermined process and/or equation.

According to the location, the pose, the confidence measure, or a combination thereof, the robotic system can derive and execute a motion plan (e.g., a sequence of controls for the actuators for moving one or more links and/or joints) to execute the task. For example, for sorting and/or relocating the target object, the motion plan can correspond to gripping the target object initially at the source location, manipulating it across space, and placing it at the destination location.

Traditional systems derive and execute motion plans strictly based on determined poses of the object. Accordingly, the traditional systems derive and execute motion plans regardless of any deviations, errors, and/or uncertainties that may have occurred upstream (e.g., in gathering the input data). As such, the traditional systems cannot mitigate or correct the deficiencies introduced upstream, which leads to task failures (e.g., failures in identifying objects and/or losing pieces during transfer) that require human intervention/input.

Unlike the traditional systems, various embodiments described below can derive and execute the motion plan according to the confidence measure. In other words, the robotic system described below can vary an approach to the target object, change a grip location on the target object, change a presentation pose/location of the target object, and/or change other portions of the motion path according to the confidence measure. As an illustrative example, the robotic system can select as a target object a box located in the pickup area. For this example, the box corresponds to a pose where an object-top surface is generally oriented horizontally and exposed, and one of the object-side surfaces (i.e., smaller/narrower than the top surface) is generally oriented vertically and also exposed. The robotic system can include in master data that the object has one identifier on an object-bottom surface (i.e., opposite to the object-top surface) and a smaller identifier on one of the object-side surfaces. When the robotic system processes the image of the pickup location in identifying the target object, the robotic system can calculate the confidence measure. For example, the confidence measure can correspond to a measure of the match between one or more visible characteristics of the box (e.g., a shape, a color, an image, a design, a logo, a text, etc.) captured in the image to predetermined information in the master data. If the confidence measure is above a threshold, such that the robotic system recognizes with sufficient certainty that the object-top surface is exposed on top of the box, the robotic system can place an end-effector over the exposed top surface, grip the top surface, and rotate the target object to present a bottom surface at a fixed location before a scanner. If the confidence measure is below a threshold, such that the robotic system cannot recognize whether the top surface or the bottom surface is exposed, the robotic system can place the end-effector by one of the object-side surfaces, grip the object-side surface, and rotate the target object to pass between a set of opposing scanners.

Scanning the target object in the air (e.g., at a location between the start location and the task location) provides improved efficiency and speed for performing the task. By calculating the motion plan that includes the scanning locations and also coordinates with the object scanners, the robotic system can effectively combine the task for transferring the target object with the task for scanning the target object. Moreover, deriving the motion plan based on the confidence measure of the initial orientation further improves efficiency, speed, and accuracy for the scanning task. The robotic system can calculate the motion plan that accounts for alternative orientations that correspond to a hypothesis that the initial pose is inaccurate. Accordingly, the robotic system can increase the likelihood of accurately/successfully scanning the target object even with pose determination errors (e.g., resulting from calibration errors, unexpected poses, unexpected lighting conditions, etc.). The increased likelihood in accurate scans can lead to increased overall throughput for the robotic system and further reduce operator efforts/interventions. Details regarding the confidence calculation and the associated path calculation are described below.

In the following description, numerous specific details are set forth to provide a thorough understanding of the present disclosure. In other embodiments, the techniques introduced here can be practiced without these specific details. In other instances, well-known features, such as specific functions or routines, are not described in detail in order to avoid unnecessarily obscuring the present disclosure. References in this description to "an embodiment," "one embodiment," or the like mean that a particular feature, structure, material, or characteristic being described is included in at least one embodiment of the present disclosure. Thus, the appearances of such phrases in this specification do not necessarily all refer to the same embodiment. On the other hand, such references are not necessarily mutually exclusive either. Furthermore, the particular features, structures, materials, or characteristics can be combined in any suitable manner in one or more embodiments. It is to be understood that the various embodiments shown in the figures are merely illustrative representations and are not necessarily drawn to scale.

Several details describing structures or processes that are well-known and often associated with robotic systems and subsystems, but that can unnecessarily obscure some significant aspects of the disclosed techniques, are not set forth in the following description for purposes of clarity. Moreover, although the following disclosure sets forth several embodiments of different aspects of the present disclosure, several other embodiments can have different configurations or different components than those described in this section. Accordingly, the disclosed techniques can have other embodiments with additional elements or without several of the elements described below.

Many embodiments or aspects of the present disclosure described below can take the form of computer- or controller-executable instructions, including routines executed by a programmable computer or controller. Those skilled in the relevant art will appreciate that the disclosed techniques can be practiced on computer or controller systems other than those shown and described below. The techniques described herein can be embodied in a special-purpose computer or data processor that is specifically programmed, configured, or constructed to execute one or more of the computer-executable instructions described below. Accordingly, the terms "computer" and "controller" as generally used herein refer to any data processor and can include Internet appliances and handheld devices (including palm-top computers, wearable computers, cellular or mobile phones, multi-processor systems, processor-based or programmable consumer electronics, network computers, mini computers, and the like). Information handled by these computers and controllers can be presented at any suitable display medium, including a liquid crystal display (LCD). Instructions for executing computer- or controller-executable tasks can be stored in or on any suitable computer-readable medium, including hardware, firmware, or a combination of hardware and firmware. Instructions can be contained in any suitable memory device, including, for example, a flash drive and/or other suitable medium.

The terms "coupled" and "connected," along with their derivatives, can be used herein to describe structural relationships between components. It should be understood that these terms are not intended as synonyms for each other. Rather, in particular embodiments, "connected" can be used to indicate that two or more elements are in direct contact with each other. Unless otherwise made apparent in the context, the term "coupled" can be used to indicate that two or more elements are in either direct or indirect (with other intervening elements between them) contact with each other, or that the two or more elements cooperate or interact with each other (e.g., as in a cause-and-effect relationship, such as for signal transmission/reception or for function calls), or both.

Suitable Environments

FIG. 1 is an illustration of an example environment in which a robotic system 100 with an enhanced scanning mechanism may operate. The robotic system 100 includes one or more structures (e.g., robots) configured to execute one or more tasks. Aspects of the enhanced scanning mechanism can be practiced or implemented by the various structures.

For the example illustrated in FIG. 1, the robotic system 100 can include an unloading unit 102, a transfer unit 104 (e.g., a palletizing robot and/or a piece-picker robot), a transport unit 106, a loading unit 108, or a combination thereof in a warehouse or a distribution/shipping hub. Each of the units in the robotic system 100 can be configured to execute one or more tasks. The tasks can be combined in sequence to perform an operation that achieves a goal, such as to unload objects from a truck or a van for storage in a warehouse or to unload objects from storage locations and load them onto a truck or a van for shipping. For another example, the task can include moving objects from one container to another. Each of the units can be configured to execute a sequence of actions (e.g., operating one or more components therein) to execute a task.

In some embodiments, the task can include manipulation (e.g., moving and/or reorienting) of a target object 112 (e.g., a box, a case, a cage, a pallet, etc. targeted for manipulation) from a start location 114 to a task location 116. For example, the unloading unit 102 (e.g., a devanning robot) can be configured to transfer the target object 112 from a location in a carrier (e.g., a truck) to a location on a conveyor belt. Also, the transfer unit 104 can be configured to transfer the target object 112 from one location (e.g., the conveyor belt, a pallet, or a bin) to another location (e.g., a pallet, a bin, or a cage on the transport unit 106). For another example, the transfer unit 104 (e.g., a piece-picking robot) can be configured to transfer the target object 112 from one container to another. In completing the operation, the transport unit 106 can transfer the target object 112 from an area associated with the transfer unit 104 to an area associated with the loading unit 108, and the loading unit 108 can transfer the target object 112 (by, e.g., moving the pallet carrying the target object 112) from the transfer unit 104 to a storage location (e.g., a location on the shelves). Details regarding the task and the associated actions are described below.

For illustrative purposes, the robotic system 100 is described in the context of a shipping center; however, it is understood that the robotic system 100 can be configured to execute tasks in other environments/for other purposes, such as for manufacturing, assembly, packaging, healthcare, and/or other types of automation. It is also understood that the robotic system 100 can include other units, such as manipulators, service robots, modular robots, etc., not shown in FIG. 1. For example, in some embodiments, the robotic system 100 can include a depalletizing unit for transferring the objects from cage carts or pallets onto conveyors or other pallets, a container-switching unit for transferring the objects from one container to another, a packaging unit for wrapping the objects, a sorting unit for grouping objects according to one or more characteristics thereof, a piece-picking unit for manipulating (e.g., for sorting, grouping, and/or transferring) the objects differently according to one or more characteristics thereof, or a combination thereof.

Suitable System

Figure 2:
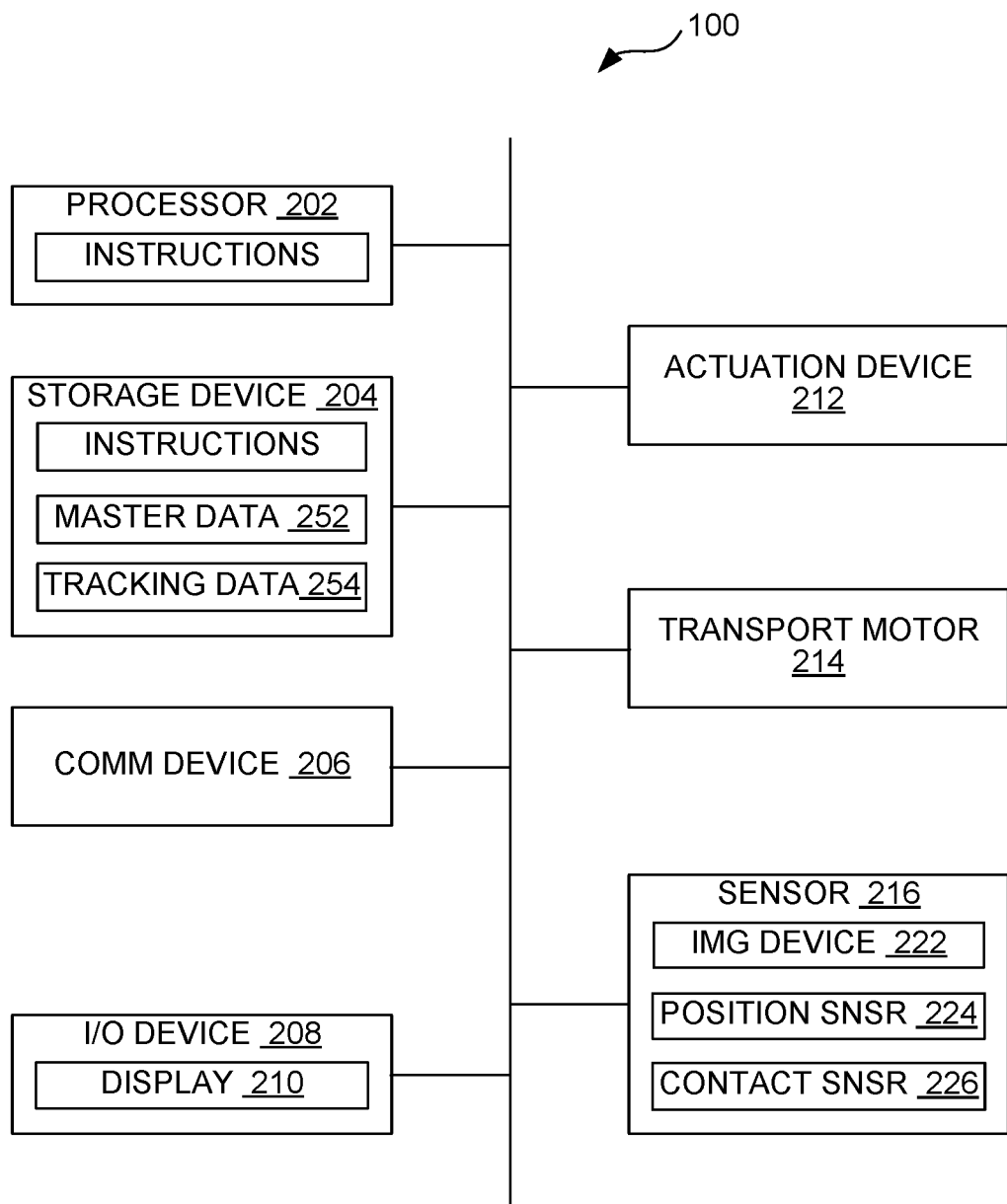
FIG. 2 is a block diagram illustrating the robotic system in accordance with one or more embodiments of the present disclosure.

FIG. 2 is a block diagram illustrating the robotic system 100 in accordance with one or more embodiments of the present disclosure. In some embodiments, for example, the robotic system 100 (e.g., at one or more of the units and/or robots described above) can include electronic/electrical devices, such as one or more processors 202, one or more storage devices 204, one or more communication devices 206, one or more input-output devices 208, one or more actuation devices 212, one or more transport motors 214, one or more sensors 216, or a combination thereof. The various devices can be coupled to each other via wire connections and/or wireless connections. For example, the robotic system 100 can include a bus, such as a system bus, a Peripheral Component Interconnect (PCI) bus or PCI-Express bus, a HyperTransport or industry standard architecture (ISA) bus, a small computer system interface (SCSI) bus, a universal serial bus (USB), an IIC (I2C) bus, or an Institute of Electrical and Electronics Engineers (IEEE) standard 1394 bus (also referred to as "Firewire"). Also, for example, the robotic system 100 can include bridges, adapters, controllers, or other signal-related devices for providing the wire connections between the devices. The wireless connections can be based on, for example, cellular communication protocols (e.g., 3G, 4G, LTE, 5G, etc.), wireless local area network (LAN) protocols (e.g., wireless fidelity (WIFI)), peer-to-peer or device-to-device communication protocols (e.g., Bluetooth, Near-Field communication (NFC), etc.), Internet of Things (IoT) protocols (e.g., NB-IoT, LTE-M, etc.), and/or other wireless communication protocols.

The processors 202 can include data processors (e.g., central processing units (CPUs), special-purpose computers, and/or onboard servers) configured to execute instructions (e.g. software instructions) stored on the storage devices 204 (e.g., computer memory). The processors 202 can implement the program instructions to control/interface with other devices, thereby causing the robotic system 100 to execute actions, tasks, and/or operations.

The storage devices 204 can include non-transitory computer-readable mediums having stored thereon program instructions (e.g., software). Some examples of the storage devices 204 can include volatile memory (e.g., cache and/or random-access memory (RAM)) and/or non-volatile memory (e.g., flash memory and/or magnetic disk drives). Other examples of the storage devices 204 can include portable memory drives and/or cloud storage devices.

In some embodiments, the storage devices 204 can be used to further store and provide access to processing results and/or predetermined data/thresholds. For example, the storage devices 204 can store master data 252 that includes descriptions of objects (e.g., boxes, cases, and/or products) that may be manipulated by the robotic system 100. In one or more embodiments, the master data 252 can include a dimension, a shape (e.g., templates for potential poses and/or computer-generated models for recognizing the object in different poses), a color scheme, an image, identification information (e.g., bar codes, quick response (QR) codes, logos, etc., and/or expected locations thereof), an expected weight, or a combination thereof for the objects expected to be manipulated by the robotic system 100. In some embodiments, the master data 252 can include manipulation-related information regarding the objects, such as a center-of-mass location on each of the objects, expected sensor measurements (e.g., for force, torque, pressure, and/or contact measurements) corresponding to one or more actions/maneuvers, or a combination thereof. Also, for example, the storage devices 204 can store object tracking data 254. In some embodiments, the object tracking data 254 can include a log of scanned or manipulated objects. In some embodiments, the object tracking data 254 can include imaging data (e.g., a picture, point cloud, live video feed, etc.) of the objects at one or more locations (e.g., designated pickup or drop locations and/or conveyor belts). In some embodiments, the object tracking data 254 can include locations and/or orientations of the objects at the one or more locations.

The communication devices 206 can include circuits configured to communicate with external or remote devices via a network. For example, the communication devices 206 can include receivers, transmitters, modulators/demodulators (modems), signal detectors, signal encoders/decoders, connector ports, network cards, etc. The communication devices 206 can be configured to send, receive, and/or process electrical signals according to one or more communication protocols (e.g., the Internet Protocol (IP), wireless communication protocols, etc.). In some embodiments, the robotic system 100 can use the communication devices 206 to exchange information between units of the robotic system 100 and/or exchange information (e.g., for reporting, data gathering, analyzing, and/or troubleshooting purposes) with systems or devices external to the robotic system 100.

The input-output devices 208 can include user interface devices configured to communicate information to and/or receive information from human operators. For example, the input-output devices 208 can include a display 210 and/or other output devices (e.g., a speaker, a haptics circuit, or a tactile feedback device, etc.) for communicating information to the human operator. Also, the input-output devices 208 can include control or receiving devices, such as a keyboard, a mouse, a touchscreen, a microphone, a user interface (UI) sensor (e.g., a camera for receiving motion commands), a wearable input device, etc. In some embodiments, the robotic system 100 can use the input-output devices 208 to interact with the human operators in executing an action, a task, an operation, or a combination thereof.

The robotic system 100 can include physical or structural members (e.g., robotic manipulator arms) that are connected at joints for motion (e.g., rotational and/or translational displacements). The structural members and the joints can form a kinetic chain configured to manipulate an end-effector (e.g., the gripper) configured to execute one or more tasks (e.g., gripping, spinning, welding, etc.) depending on the use/operation of the robotic system 100. The robotic system 100 can include the actuation devices 212 (e.g., motors, actuators, wires, artificial muscles, electroactive polymers, etc.) configured to drive or manipulate (e.g., displace and/or reorient) the structural members about or at a corresponding joint. In some embodiments, the robotic system 100 can include the transport motors 214 configured to transport the corresponding units/chassis from place to place.

The robotic system 100 can include the sensors 216 configured to obtain information used to implement the tasks, such as for manipulating the structural members and/or for transporting the robotic units. The sensors 216 can include devices configured to detect or measure one or more physical properties of the robotic system 100 (e.g., a state, a condition, and/or a location of one or more structural members/joints thereof) and/or of a surrounding environment. Some examples of the sensors 216 can include accelerometers, gyroscopes, force sensors, strain gauges, tactile sensors, torque sensors, position encoders, etc.

In some embodiments, for example, the sensors 216 can include one or more imaging devices 222 (e.g., visual and/or infrared cameras, 2-dimensional and/or 3-dimensional imaging cameras, distance measuring devices such as lidars or radars, etc.) configured to detect the surrounding environment. The imaging devices 222 can generate representations of the detected environment, such as digital images and/or point clouds, used for implementing machine/computer vision (e.g., for automatic inspection, robot guidance, or other robotic applications). As described in further detail below, the robotic system 100 (via, e.g., the processors 202) can process the digital image and/or the point cloud to identify the target object 112 of FIG. 1, the start location 114 of FIG. 1, the task location 116 of FIG. 1, a pose of the target object 112, a confidence measure regarding the start location 114 and/or the pose, or a combination thereof.

For manipulating the target object 112, the robotic system 100 (e.g., via the various units) can capture and analyze an image of a designated area (e.g., a pickup location, such as inside the truck or on the conveyor belt) to identify the target object 112 and the start location 114 thereof. Similarly, the robotic system 100 can capture and analyze an image of another designated area (e.g., a drop location for placing objects on the conveyor belt, a location for placing objects inside the container, or a location on the pallet for stacking purposes) to identify the task location 116. For example, the imaging devices 222 can include one or more cameras configured to generate images of the pickup area and/or one or more cameras configured to generate images of the task area (e.g., drop area). Based on the captured images, as described below, the robotic system 100 can determine the start location 114, the task location 116, the associated poses, and/or the confidence measures.

In some embodiments, the task can include scanning the target object 112, such as for logging the item for shipping/receiving. To accomplish the scanning portion of the task, the imaging devices 222 can include one or more scanners (e.g., barcode scanners and/or QR code scanners) configured to scan the identification information during transfer (e.g., between the start location 114 and the task location 116). Accordingly, the robotic system 100 can calculate a motion plan for presenting one or more portions of the target object 112 to one or more of the scanners.

In some embodiments, for example, the sensors 216 can include position sensors 224 (e.g., position encoders, potentiometers, etc.) configured to detect positions of structural members (e.g., the robotic arms and/or the end-effectors) and/or corresponding joints of the robotic system 100. The robotic system 100 can use the position sensors 224 to track locations and/or orientations of the structural members and/or the joints during execution of the task.

In some embodiments, for example, the sensors 216 can include contact sensors 226 (e.g., pressure sensors, force sensors, strain gauges, piezoresistive/piezoelectric sensors, capacitive sensors, elastoresistive sensors, and/or other tactile sensors) configured to measure a characteristic associated with a direct contact between multiple physical structures or surfaces. The contact sensors 226 can measure the characteristic that corresponds to a grip of the end-effector (e.g., the gripper) on the target object 112. Accordingly, the contact sensors 226 can output a contact measure that represents a quantified measure (e.g., a measured force, torque, position, etc.) corresponding to a degree of contact or attachment between the gripper and the target object 112. For example, the contact measure can include one or more force or torque readings associated with forces applied to the target object 112 by the end-effector. Details regarding the contact measure are described below.

Initial Pose and Uncertainty Determinations

FIG. 3A, FIG. 3B, and FIG. 3C are illustrations of an object 302 in various poses (e.g., a first pose 312, a second pose 314, and/or a third pose 316). A pose can represent a position and/or an orientation of the object 302. In other words, the pose can include a translational component and/or a rotational component according to a grid system utilized by the robotic system 100. In some embodiments, the pose can be represented by a vector, a set of angles (e.g., Euler angles and/or roll-pitch-yaw angles), a homogeneous transformation, or a combination thereof. The transformation of the object 302 can include a representation of a combination of the translational component, the rotational component, a change therein, or a combination thereof. The robotic system 100 can process an imaging output (e.g., a 2-dimensional image, a 3-dimensional image, a point cloud, and/or other imaging data from the imaging devices 222 of FIG. 2) to identify the pose of the object 302. For example, the robotic system 100 can analyze the imaging output of one or more cameras directed to the pickup area to identify the pose of the object 302 (e.g., the target object 112 of FIG. 1) located therein.

For identifying the pose, the robotic system 100 can first analyze the imaging data according to a pattern recognition mechanism and/or a set of rules to identify object outlines (e.g., perimeter edges or surfaces). The robotic system 100 can further identify groupings of object outlines (e.g., according to predetermined rules and/or pose templates) as corresponding to each unique instance of objects. For example, the robotic system 100 can identify the groupings of the object outlines that correspond to a pattern (e.g., same values or varying at a known rate/pattern) in the color, the brightness, the depth/location, or a combination thereof across the object lines. Also, for example, the robotic system 100 can identify the groupings of the object outlines according to predetermined shape/pose templates defined in the master data 252 of FIG. 2.

Once the object outlines are grouped, the robotic system 100 can identify the pose of the object 302 relative to one or more coordinate systems, such as according to a grid or a coordinate system used by the robotic system 100. For example, the robotic system 100 can identify one or more surfaces, edges, and/or points of the object 302 and the orientation/location thereof according to the one or more coordinate systems.

In some embodiments, the robotic system 100 can identify one or more exposed surfaces (e.g., a first exposed surface 304, a second exposed surface 306, etc.) of the object 302 in the imaging data. For example, the robotic system 100 can determine an outline shape and/or one or more dimensions (e.g., length, width, and/or height) of the object 302 from the imaging data according to the object outlines and the calibration or mapping data for the imaging devices 222. The robotic system 100 can compare the determined dimensions to corresponding data in the master data 252 to identify the object 302. Further, the robotic system 100 can identify an exposed surface as an object-top surface 322 or an object-bottom surface 324 when dimensions of the exposed surface match a length and a width of the identified object. Also, the robotic system 100 can identify the exposed surface as an object-peripheral surface 326 when one of the dimensions of the exposed surface matches a height of the identified object.

In some embodiments, for example, the robotic system 100 can identify the object 302 based on one or more markings (e.g., a letter, a number, a shape, a visual image, a logo, or a combination thereof) displayed on the one or more exposed surfaces. The robotic system 100 can identify the object 302 based on comparing the markings to one or more predetermined images in the master data 252. For example, the robotic system 100 can include one or more images of a product name, a logo, a design/image on the package surface, or a combination thereof in the master data 252. The robotic system 100 can compare a portion of the imaging data (e.g., a portion within object outlines of the object 302) to the master data 252 to identify the object 302. The robotic system 100 can similarly identify an orientation of the object 302 based on matching the portion of the imaging data to a predetermined image pattern that is unique for a surface.

As an illustrative example, FIG. 3A, FIG. 3B, and FIG. 3C illustrate example imaging data corresponding to different poses of the object 302. FIG. 3A illustrates a first pose 312 where the first exposed surface 304 (e.g., an exposed surface facing up) is the object-top surface 322 and the second exposed surface 306 (e.g. an exposed surface generally facing a source of the imaging data) is one of the object-peripheral surfaces 326.

In identifying the exposed surfaces, the robotic system 100 can process the imaging data of FIG. 3A to measure the dimensions (e.g., number of pixels) of the first exposed surface 304 and/or the second exposed surface 306. The robotic system 100 can map the measurements in the imaging data to real-world dimensions using a predetermined camera calibration or mapping function. The robotic system 100 can compare the mapped dimensions to dimensions of known/expected objects in the master data 252 and identify the object based on matching the dimensions. Further, the robotic system 100 can identify that the first exposed surface 304 is either the object-top surface 322 or the object-bottom surface 324 since a pair of intersecting object edges that bound the first exposed surface 304 matches the length and the width of the identified object. Similarly, the robotic system 100 can identify the second exposed surface 306 as the object-peripheral surface 326 since one of the object edges defining the second exposed surface 306 matches the height of the identified object.

In some embodiments, the robotic system 100 can process the imaging data of FIG. 3A to identify one or more markings unique to a surface of the object. For example, the robotic system 100 can include in the master data 252 one or more images and/or other visual characteristics (e.g., color, dimension, size, etc.) of surfaces and/or unique markings of the object as described above. As illustrated in FIG. 3A, the robotic system 100 can identify the object as the object listed in the master data 252 as having 'A' on the object-top surface 322. Accordingly, the robotic system 100 can further identify the first exposed surface 304 as the object-top surface 322.

In some embodiments, the robotic system 100 can include in the master data 252 information regarding an object identifier 332 (e.g., a computer-readable visual identifier, such as a bar code or a QR code, that is unique to the object 302). For example, the master data 252 can include the image and/or coded message of the object identifier 332, an identifier location 334 relative to a surface and/or a set of edges, one or more visual characteristics thereof, or a combination thereof. As illustrated in FIG. 3A, the robotic system 100 can identify the second exposed surface 306 as the object-peripheral surface 326 based on the presence of the object identifier 332 on the surface and/or the location thereof matching the identifier location 334.

FIG. 3B illustrates a second pose 314 where the object 302 is rotated 90 degrees about a vertical axis along a direction B in FIG. 3A. For example, a reference point 'a' of the object 302 can be in the lower left corner in FIG. 3A and in the lower right corner in FIG. 3B. Accordingly, in comparison to the first pose 312, the object-top surface 322 can be seen in the imaging data in a different orientation and/or the object-peripheral surface 326 having the object identifier 332 can be hidden from view.

The robotic system 100 can identify the different poses based on a special orientation of one or more identifying visual features. For example, the robotic system 100 can determine the first pose 312 and/or the third pose 316 when a dimension matching a known length of an object extends horizontally in the imaging data, a dimension matching a known height of the object extends vertically in the imaging data, and/or dimension that matches a known width of the object extends along a depth axis in the imaging data. Similarly, the robotic system 100 can determine the second pose 314 when the dimension matching the width extends horizontally, the dimension matching the height extends vertically, and/or the dimension matching the length extends along the depth axis. Also, for example, the robotic system 100 can determine that the object 302 is in the first pose 312 or the second pose 314 based on an orientation of a visible marking, such as 'A' shown in FIG. 3A and FIG. 3B. Also, for example, the robotic system 100 can determine that the object 302 is in the first pose 312 according to visible markings seen in a combination of surfaces, such as when the object identifier 332 is visible with (i.e., on different surfaces) the marking 'A.'

FIG. 3C illustrates a third pose 316 where the object 302 is rotated 180 degrees about a horizontal axis along a direction C in FIG. 3A. For example, a reference point 'a' of the object 302 can be in the lower left front corner in FIG. 3A and in the upper left back corner in FIG. 3C. Accordingly, in comparison to the first pose 312, the first exposed surface 304 can be the object-bottom surface 324, and both the object-top surface 322 and the object-peripheral surface 326 having the object identifier 332 can be hidden from view.

As described above, the robotic system 100 can identify that the object 302 is in either the first pose 312 or the third pose 316 based on the dimensions. The robotic system 100 can identify that the object 302 is in the first pose 312 when a top surface marker (e.g., 'A') is visible. Also, the robotic system 100 can identify that the object 302 is in the third pose 316 when a bottom-surface marker (e.g., an instance of the object identifier 332) is visible.

In determining the pose of the object 302, real-world conditions may affect the accuracy of the determination. For example, lighting conditions may reduce visibility of surface markings, such as due to reflections and/or shadows. Also, an actual orientation of the object 302 may reduce an exposure or viewing angle of one or more presented surfaces such that any markings thereon may be unidentifiable. As such, in some embodiments, the robotic system 100 can calculate a confidence measure associated with a determined pose. The confidence measure can represent a measure of accuracy of the determined pose. In some embodiments, the confidence measure can correspond to a likelihood that the determined pose matches the actual pose of the object 302.

In some embodiments, for example, the robotic system 100 can calculate the confidence measure based on a measure of the match used in determining the pose. For example, the robotic system 100 can calculate the confidence measure based on a certainty interval associated with the measurements of dimensions in the image. In some embodiments, the certainty interval can increase as a distance between the object 302 and the imaging source (e.g., the imaging devices 222 of FIG. 2) decreases and/or when a measured edge of the object 302 is closer to being orthogonal to a direction radiating from the imaging source and farther away from being parallel to the radiating direction. Also, for example, the robotic system 100 can calculate the confidence measure based on a degree of match between a marker or a design in the imaging data to a known marker/design in the master data 252. In some embodiments, the robotic system 100 can use an overlap or a deviation measure between the imaging data or a portion thereof and the predetermined markers/images. The robotic system 100 can identify the object and/or the orientation according to the greatest overlap and/or the lowest deviation measure, such as for a minimum mean square error (MMSE) mechanism. Moreover, the robotic system can calculate the confidence measure based on the resulting overlap/deviation measure. As described in more detail below, the robotic system 100 can calculate a motion path according to the confidence measure. In other words, the robotic system 100 can move the object 302 differently according to the confidence measure.

System Operation

Figure 4:
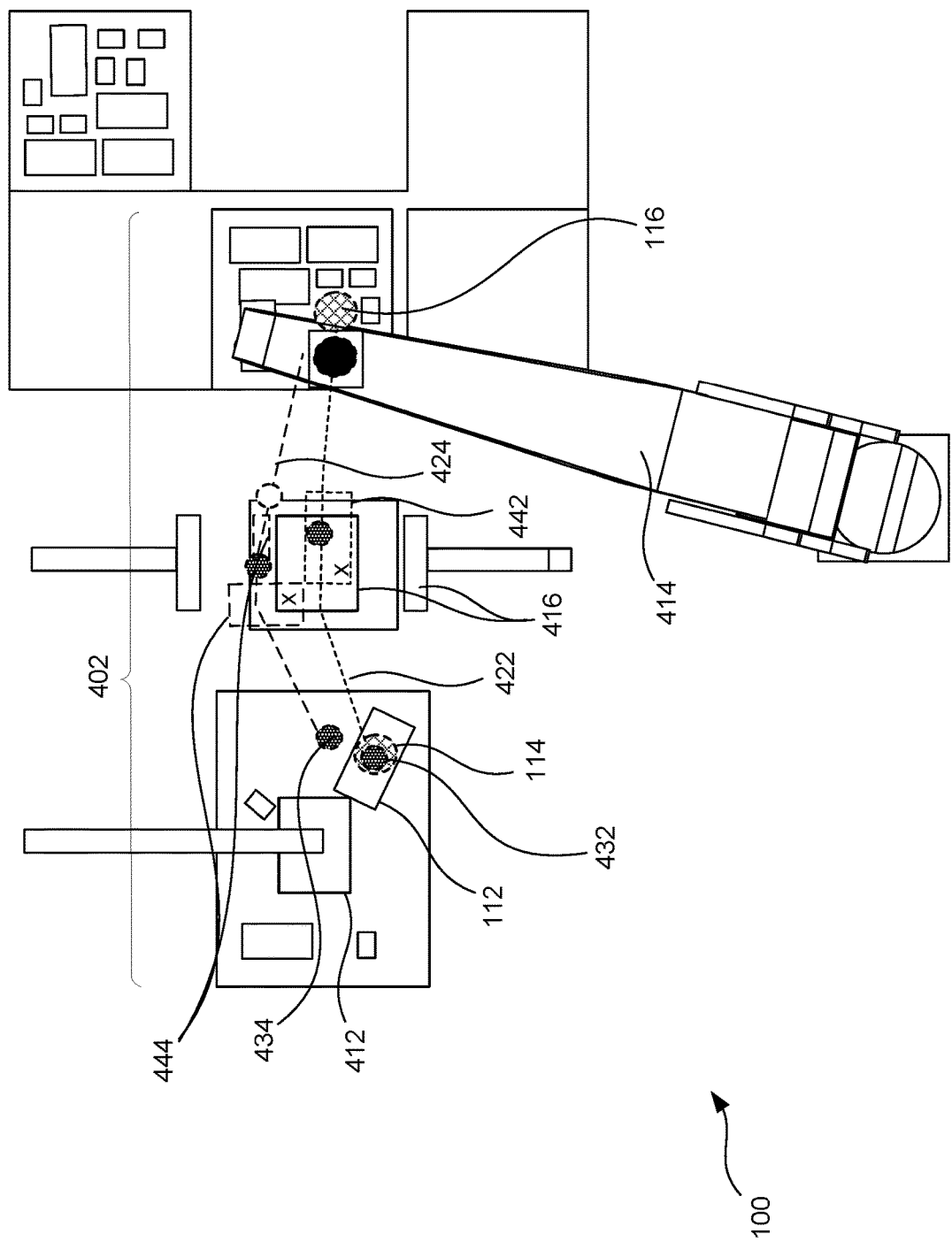
FIG. 4 is a top view illustrating an example task executed by the robotic system in accordance with one or more embodiments of the present disclosure.

FIG. 4 is a top view illustrating an example task 402 executed by the robotic system 100 in accordance with one or more embodiments of the present disclosure. As described above, the task 402 can represent a sequence of actions executed by the robotic system 100 (e.g., by one of the units described above, such as the transfer unit 104 of FIG. 1) to achieve a goal. As illustrated in FIG. 4, for example, the task 402 can include moving the target object 112 from the start location 114 (e.g., a location on/in a receiving pallet or bin) to the task location 116 (e.g., a location on/in a sorted pallet or bin). The task 402 can further include scanning the target object 112 while moving from the start location 114 to the task location 116. Accordingly, the robotic system 100 can update the object tracking data 254 of FIG. 2 according to the scanned information, such as by adding, removing, and/or verifying the scanned object from the object tracking data 254.

In some embodiments, the robotic system 100 can image a predetermined area to identify and/or locate the start location 114. For example, the robotic system 100 can include a source scanner 412 (i.e., an instance of the imaging devices 222 of FIG. 2) directed at a pickup area, such as an area designated for a sourcing pallet or bin and/or a region on a receiving side of the conveyor belt. The robotic system 100 can use the source scanner 412 to generate imaging data (e.g., a captured image and/or a point cloud) of the designated area. The robotic system 100 (via, e.g., the processors 202 of FIG. 2) can implement computer vision processes for the imaging data to identify the different objects (e.g., boxes or cases) located in the designated area. Details of the object identification are described below.

From the recognized objects, the robotic system 100 can select (e.g., according to a predetermined sequence or set of rules and/or templates of object outlines) one object as the target object 112 for an execution of the task 402. For the selected target object 112, the robotic system 100 can further process the imaging data to determine the start location 114 and/or an initial pose. Details of the selection and the location/pose determination are described below.

The robotic system 100 can further image and process another predetermined area to identify the task location 116. In some embodiments, for example, the robotic system 100 can include another instance of the imaging devices 222 (not shown) configured to generate imaging data of a placement area, such as an area designated for a sorted pallet or bin and/or a region on a sending side of the conveyor belt. The imaging result can be processed (via, e.g., the processors 202) to identify the task location 116 and/or a corresponding pose for placing the target object 112. In some embodiments, the robotic system 100 can identify (based on or not based on the imaging result) the task location 116 according to a predetermined sequence or set of rules for stacking and/or arranging multiple objects.

In some embodiments, the task 402 can include scanning (e.g., scanning the object identifier 332 of FIG. 3A and/or FIG. 3C) the target object 112 for product logging purposes and/or for further identifying the target object 112. For example, the robotic system 100 can include one or more object scanners 416 (e.g., further instances of the imaging devices 222, such as barcode scanners or QR code scanners) configured to scan the target object 112, typically at one or more locations between the pickup area and the placement area. In some embodiments, the object scanners 416 can face horizontal directions to scan marks that are adjacent to the scanners (e.g., at a height corresponding to that of the corresponding scanner(s)) and on vertically oriented surfaces. In some embodiments, the object scanners 416 can face vertical directions to scan marks that are above/below the scanner and on horizontally oriented surfaces. In some embodiments, the object scanners 416 can face each other such that they can scan opposite sides of the object that is placed between the object scanners 416. According to the location and/or scanning direction of the object scanners 416, the robotic system 100 can manipulate the target object 112 to place the target object 112 at a presentation location and/or according to a presentation pose for scanning one or more surfaces/portions of the target object 112 with the object scanners 416.

Using the identified start location 114 and/or the task location 116, the robotic system 100 can operate one or more structures (e.g., a robotic arm 414 and/or the end-effector) of a corresponding unit (e.g., the transfer unit 104) to execute the task 402. Accordingly, the robotic system 100 (via, e.g., the processors 202) can calculate (via, e.g., motion planning rules or algorithms) a motion plan that corresponds to one or more actions that will be implemented by the corresponding unit to execute the task 402. For example, the motion plan for the transfer unit 104 can include positioning the end-effector at an approach location (e.g., a location/position for placing an end-effector to contact and grip the target object 112), gripping the target object 112, lifting the target object 112, transferring the target object 112 from above the start location 114 to the presentation location/pose for the scanning operation, transferring the target object 112 from the presentation location to above the task location 116, lowering the target object 112, and releasing the target object 112.

In some embodiments, the robotic system 100 can calculate the motion plan by determining a sequence of commands and/or settings for one or more of the actuation devices 212 of FIG. 2 that operate the robotic arm 414 and/or the end-effector. For example, the robotic system 100 can use the processors 202 to calculate the commands and/or settings of the actuation devices 212 for manipulating the end-effector and the robotic arm 414 to place the end-effector (e.g., a gripper) at the approach location about the start location 114, engage and grab the target object 112 with the end-effector, place the end-effector at a scanning position (e.g., a designated location and/or orientation) about the presentation location, place the end-effector at a particular location about the task location 116, and release the target object 112 from the end-effector. The robotic system 100 can execute the actions for completing the task 402 by operating the actuation devices 212 according to the determined sequence of commands and/or settings.

In some embodiments, the robotic system 100 can derive the motion plan based on a confidence measure that represents a measure of certainty or likelihood that the determined pose matches the actual real-world pose of the target object 112. For example, the robotic system 100 can place the end-effector at different locations for pickup, such as for gripping or covering different surfaces, calculate different presentation locations/poses for the target object 112, or a combination thereof according to the confidence measure.

As an illustrative example, the target object 112 can be the object 302 of FIG. 3A placed in the first pose 312 of FIG. 3A (i.e., the object-top surface 322 of FIG. 3A generally facing up and exposed). When the confidence measure is high (i.e., a degree of certainty above a threshold, representing that the determined pose is more likely accurate), the robotic system 100 can calculate a first motion plan 422 that includes a first approach location 432 and a first presentation location 442. For example, since there is sufficient certainty that the object-top surface 322 is facing upward (i.e., the object-bottom surface 324 of FIG. 3C with the object identifier 332 of FIG. 3C is facing downward), the robotic system 100 may calculate the first motion plan 422, which includes the first approach location 432, for placing the end-effector directly over the object-top surface 322. Accordingly, the robotic system 100 can grip the target object 112 with the end-effector contacting/covering the object-top surface 322 such that the object-bottom surface 324 is exposed. Also, the robotic system 100 can calculate the first motion plan 422 that includes the first presentation location 442 for the target object 112 directly over an upward-facing scanner for scanning the object identifier 332 located on the object-bottom surface 324.

In contrast, when the confidence measure is low (i.e., a degree of certainty below a threshold, representing that the determined pose is less likely accurate), the robotic system 100 can calculate a second motion plan 424 (i.e., different from the first motion plan 422) that includes a second approach location 434 and one or more second presentation locations 444. For example, the robotic system 100 can measure and compare the dimensions of the target object 112 and determine (e.g., when the certainty levels of the measurements exceed a predetermined threshold) that the object is in either the first pose 312 of FIG. 3A or the third pose 316 of FIG. 3C. However, the robotic system 100 may have difficulties imaging/processing marks printed on the surface of the target object 112 such that the confidence measure associated with the determined pose is below a threshold. In other words, the robotic system 100 may not be sufficiently certain whether the upward facing exposed surface is the object-top surface 322 (e.g., the first pose 312) or the object-bottom surface 324 (e.g., the third pose 316).

Due to the higher degree of uncertainty, the robotic system 100 may calculate the second motion plan 424 that includes the second approach location 434 for placing the end-effector adjacent (e.g., aligned with and/or facing a direction parallel to the object-top surface 322 and/or the object-bottom surface 324) to one of the object-peripheral surfaces 326 of FIG. 3A. Accordingly, the robotic system 100 can grip the target object 112 with the end-effector contacting/covering one of the object-peripheral surfaces 326 and exposing both the object-top surface 322 and the object-bottom surface 324. The robotic system 100 can simultaneously or sequentially present or place the object-top surface 322 and the object-bottom surface 324 before (e.g., in the scanning fields of and/or facing) the object scanners 416. When the target object 112 is in place for the scan, the robotic system 100 can operate the object scanners 416 (e.g., at least the scanners facing the object-top surface 322 and the object-bottom surface 324) to simultaneously and/or sequentially scan the presented surfaces and capture the object identifier(s) 332 thereon.

Also, the robotic system 100 can calculate the second motion plan 424, which includes the second presentation location(s) 444, for placing an initially downward-facing surface (the object-bottom surface 324) horizontally and directly over an upward-facing scanner and/or for placing an initially upward-facing surface (the object-top surface 322) vertically and directly in front of a horizontally facing scanner. The second motion plan 424 can include a reorienting/rotating action (e.g., as represented by a dotted-unfilled circle) for providing the two presentation locations/poses, thereby scanning both opposing top/bottom surfaces using orthogonally directed scanners. For example, the robotic system 100 can sequentially present the object-top surface 322 to an upward-facing scanner and scan, and then rotate the target object 112 90 degrees to present the object-bottom surface 324 to a horizontally-facing scanner for scanning. In some embodiments, the reorienting/rotating action can be conditional such that the robotic system 100 implements the corresponding commands when the first scan is unsuccessful in reading the object identifier 332.

Alternatively, as an example, the robotic system 100 can calculate a motion plan (not shown) for gripping/covering one of the object-peripheral surfaces 326 along the width of the target object 112 when the confidence measure is low. The robotic system 100 can move the target object 112 between a horizontally opposing pair of the object scanners 416 to present the object-peripheral surfaces 326 along the length of the target object 112 to scan the object identifier 332 on one of such peripheral surfaces (e.g., as shown in FIG. 3A). Details regarding the motion planning based on the confidence measure are described below.

In executing the actions for the task 402, the robotic system 100 can track a current location (e.g., a set of coordinates corresponding to a grid used by the robotic system 100) and/or a current pose of the target object 112. For example, the robotic system 100 (via, e.g., the processors 202) can track the current location/pose according to data from the position sensors 224 of FIG. 2. The robotic system 100 can locate one or more portions of the robotic arm 414 (e.g., the structural members and/or the joints thereof) in the kinetic chain according to the data from the position sensors 224. The robotic system 100 can further calculate the location/pose of the end-effector, and thereby the current location of the target object 112 held by the end-effector, based on the location and orientation of the robotic arm 414. Also, the robotic system 100 can track the current location based on processing other sensor readings (e.g., force readings or accelerometer readings), the executed actuation commands/settings and/or associated timings, or a combination thereof according to a dead-reckoning mechanism.

Operational Flow

Figure 5A:
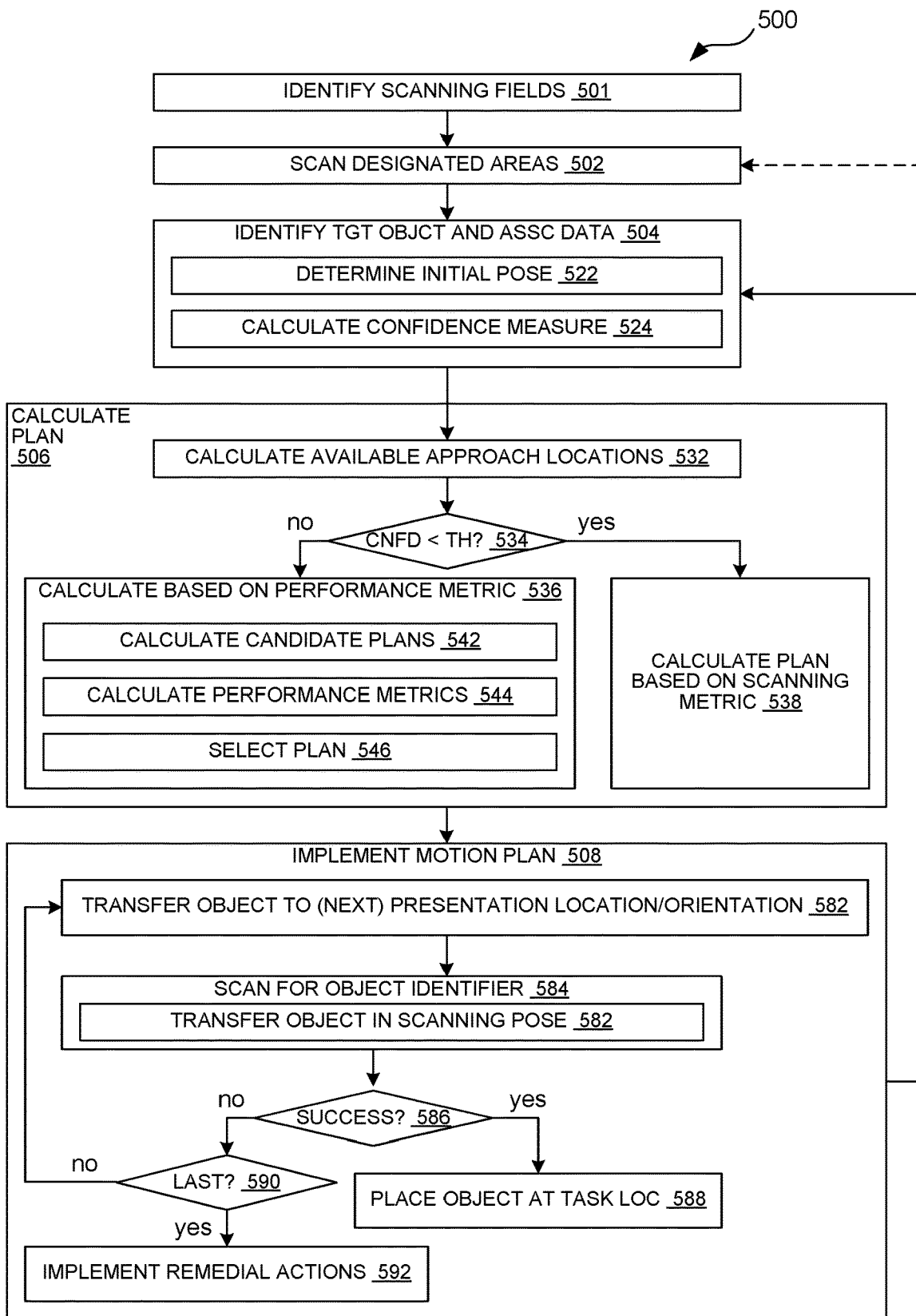
FIG. 5A is a flow diagram for operating the robotic system of FIG. 1 in accordance with one or more embodiments of the present disclosure.

FIG. 5A is a flow diagram for a method 500 of operating the robotic system 100 of FIG. 1 in accordance with one or more embodiments of the present disclosure. The method 500 can be for executing the task 402 of FIG. 4 according to a confidence measure associated with an initial pose determination. The method 500 can be for deriving/calculating and implementing a motion plan based on the confidence measure. The method 500 can be implemented based on executing the instructions stored on one or more of the storage devices 204 of FIG. 2 with one or more of the processors 202 of FIG. 2.

At block 501, the robotic system 100 can identify scanning fields of one or more of the imaging devices 222 of FIG. 2. For example, the robotic system 100 (via, e.g., one or more of the processors 202) can identify spaces that can be scanned by one or more of the imaging devices 222, such as the source scanner 412 of FIG. 4 and/or the object scanners 416 of FIG. 4. In some embodiments, the robotic system 100 can identify the scanning fields that are oriented in opposite directions and/or orthogonal directions according to orientations of the object scanners 416. As illustrated in FIG. 4, in some embodiments, the object scanners 416 can be arranged opposite each other and/or facing each other, such as across a horizontal direction or across a vertical direction. Also, in some embodiments, the object scanners 416 can be arranged perpendicular to each other, such as one facing up or down and another facing a horizontal direction.

In some embodiments, for example, the robotic system 100 can identify the scanning fields according to the master data 252. The master data 252 can include grid locations, coordinates, and/or other markers representing the imaging devices 222 and/or the corresponding scanning fields. The master data 252 can be predetermined according to a layout and/or a physical placement of the imaging devices 222, the capabilities of the imaging devices 222, environmental factors (e.g., lighting conditions and/or obstacles/structures), or a combination thereof. In some embodiments, the robotic system 100 can implement a calibration process to identify the scanning fields. For example, the robotic system 100 can use the transfer unit 104 of FIG. 1 to place a known mark or code at a set of locations and determine whether the corresponding imaging device accurately scans the known mark. The robotic system 100 can identify the scanning fields based on the locations of the known mark that resulted in accurate scanning results.

At block 502, the robotic system 100 can scan designated areas. In some embodiments, the robotic system 100 can use (via, e.g., commands/prompts sent by the processors 202) one or more of the imaging devices 222 (e.g., the source scanner 412 of FIG. 4 and/or other area scanners) to generate imaging data (e.g., captured digital images and/or point clouds) of one or more designated areas, such as the pickup area and/or the drop area (e.g., the source pallet/bin/conveyor and/or the task pallet/bin/conveyor). The imaging data can be communicated from the imaging devices 222 to the one or more processors 202. Accordingly, one or more of the processors 202 can receive the imaging data that represents the pickup area (e.g., including objects before execution of the task) and/or the drop area (e.g., including objects after execution of the task) for further processing.

At block 504, the robotic system 100 can identify the target object 112 of FIG. 1 and associated locations (e.g., the start location 114 of FIG. 1 and/or the task location 116 of FIG. 1) and/or orientations (e.g., initial pose). In some embodiments, for example, the robotic system 100 (via, e.g., the processors 202) can analyze the imaging data according to a pattern recognition mechanism and/or a set of rules to identify object outlines (e.g., perimeter edges and/or surfaces). The robotic system 100 can further identify groupings of object outlines (e.g., according to predetermined rules and/or pose templates) and/or surfaces as corresponding to each unique instance of objects. For example, the robotic system 100 can identify the groupings of the object outlines that correspond to a pattern (e.g., same values or varying at a known rate/pattern) in the color, the brightness, the depth/location, or a combination thereof across the object lines. Also, for example, the robotic system 100 can identify the groupings of the object outlines and/or surfaces according to predetermined shape/pose templates, images, or a combination thereof defined in the master data 252.

From the recognized objects in the pickup location, the robotic system 100 can select (e.g., according to a predetermined sequence or set of rules and/or templates of object outlines) one as the target object 112. For example, the robotic system 100 can select the target object 112 as the object located on top, such as according to the point cloud (representing the distances/positions relative to a known location of the source scanner 412). Also, for example, the robotic system 100 can select the target object 112 as the object that is located at a corner/edge and has two or more surfaces that are exposed/shown in the imaging results. Further, the robotic system 100 can select the target object 112 according to a predetermined pattern or sequence (e.g., left to right, nearest to furthest, etc., relative to a reference location).

For the selected target object 112, the robotic system 100 can further process the imaging result to determine the start location 114 and/or the initial pose. For example, the robotic system 100 can determine the start location 114 by mapping a location (e.g., a predetermined reference point for the determined pose) of the target object 112 in the imaging result to a location in the grid used by the robotic system 100. The robotic system 100 can map the locations according to a predetermined calibration map.

In some embodiments, the robotic system 100 can process the imaging results of the drop areas to determine open spaces between objects. The robotic system 100 can determine the open spaces based on mapping the object lines according to a predetermined calibration map that maps image locations to real-world locations and/or coordinates used by the system. The robotic system 100 can determine the open spaces as the space between the object lines (and thereby object surfaces) belonging to different groupings/objects. In some embodiments, the robotic system 100 can determine the open spaces suitable for the target object 112 based on measuring one or more dimensions of the open spaces and comparing the measured dimensions to one or more dimensions of the target object 112 (e.g., as stored in the master data 252 of FIG. 2). The robotic system 100 can select one of the suitable/open spaces as the task location 116 according to a predetermined pattern (e.g., left to right, nearest to furthest, bottom to top, etc., relative to a reference location).

In some embodiments, the robotic system 100 can determine the task location 116 without or in addition to processing the imaging results. For example, the robotic system 100 can place the objects at the placement area according to a predetermined sequence of actions and locations without imaging the area. Also, for example, the robotic system 100 can process the imaging results for performing multiple tasks (e.g., transferring multiple objects, such as for objects located on a common layer/tier of a stack).

At block 522, for example, the robotic system 100 can determine an initial pose (e.g., an estimate of a resting orientation of the target object 112 at the pickup location) based on processing the imaging data (e.g., the imaging data from the source scanner 412). In some embodiments, the robotic system 100 can determine the initial pose of the target object 112 based on comparing (e.g., comparing pixel values) object outlines to outlines in predetermined pose templates of the master data 252. The predetermined pose templates can include, e.g., different potential arrangements of the object outlines according to corresponding orientations of expected objects. The robotic system 100 can identify the set of object outlines (e.g., edges of an exposed surface, such as the first exposed surface 304 of FIG. 3A and/or FIG. 3C and/or the second exposed surface 306 of FIG. 3A) that were previously associated with the object selected as the target object 112. The robotic system 100 can determine the initial pose based on selecting one of the pose templates that corresponds to a lowest difference measure between the compared object outlines.

In some embodiments, for further example, the robotic system 100 can determine the initial pose of the target object 112 based on physical dimensions of the target object 112. The robotic system 100 can estimate physical dimensions of the target object 112 based on the dimensions of the exposed surfaces captured in the imaging data. The robotic system 100 can measure a length and/or an angle for each object outline in the imaging data and then map or convert the measured length to real-world or standard lengths using a calibration map, a conversion table or process, a predetermined equation, or a combination thereof. The robotic system 100 can use the measured dimensions to identify the target object 112 and/or the exposed surface(s) corresponding to the physical dimensions. The robotic system 100 can identify the object and/or the exposed surface(s) based on comparing the estimated physical dimensions to a set of known dimensions (e.g., height, length, and/or width) of objects and their surfaces in the master data 252. The robotic system 100 can use the matched set of dimensions to identify the exposed surface(s) and the corresponding orientation. For example, the robotic system 100 can identify the exposed surface as either the object-top surface 322 of FIG. 3A or the object-bottom surface 324 of FIG. 3B (e.g., a pair of opposing surfaces) when the dimensions of the exposed surface match a length and a width for an expected object. Based on the orientation of the exposed surface, the robotic system 100 can determine the initial pose (e.g., either the first pose 312 or the third pose 316 when the exposed surface is facing upward).

In some embodiments, for example, the robotic system 100 can determine the initial pose of the target object 112 based on a visual image of one or more surfaces of the target object 112 and/or one or more markings thereof. The robotic system 100 can compare the pixel values within a set of connected outlines to predetermined marking-based pose templates of the master data 252. The marking-based pose templates can include, e.g., one or more unique markings of expected objects in various different orientations. The robotic system 100 can determine the initial pose based on selecting one of the surfaces, the surface orientations, and/or the corresponding poses that results in a lowest difference measure for the compared images.

At block 524, the robotic system 100 can calculate a confidence measure associated with the initial pose. The confidence measure can represent a measure of certainty or likelihood that the initial pose matches the actual real-world pose of the target object 112. In some embodiments, the robotic system 100 can calculate the confidence measure as a part of determining the initial pose. For example, the confidence measure can correspond to the difference measure between the object outlines and the outlines in the selected template described above. Also, for example, the confidence measure can correspond to a tolerance level associated with the estimated physical dimensions and/or the angles described above. Also, for example, the confidence measure can correspond to the difference measure between a visual marking in the imaging data and the template images described above.

At block 506, the robotic system 100 can calculate a motion plan (e.g., the first motion plan 422 of FIG. 4 and/or the second motion plan 424 of FIG. 4) for executing the task 402 for the target object 112. For example, the robotic system 100 can calculate the motion plan based on calculating a sequence of commands or settings, or a combination thereof, for the actuation devices 212 of FIG. 2 that will operate the robotic arm 414 of FIG. 4 and/or the end-effector. For some tasks, the robotic system 100 can calculate the sequence and the setting values that will manipulate the robotic arm 414 and/or the end-effector to transfer the target object 112 from the start location 114 to the task location 116. The robotic system 100 can implement a motion planning mechanism (e.g., a process, a function, an equation, an algorithm, a computer-generated/readable model, or a combination thereof) configured to calculate a path in space according to one or more constraints, goals, and/or rules. For example, the robotic system 100 can use A* algorithm, D* algorithm, and/or other grid-based searches to calculate the path through space for moving the target object 112 from the start location 114 to the task location 116 through one or more presentation poses/locations (e.g., one or more corresponding scanning locations for the end-effector). The motion planning mechanism can use a further process, function, or equation, and/or a mapping table, to convert the path into the sequence of commands or settings, or combination thereof, for the actuation devices 212. In using the motion planning mechanism, the robotic system 100 can calculate the sequence that will operate the robotic arm 414 and/or the end-effector and cause the target object 112 to follow the calculated path.

In some embodiments, the robotic system 100 can selectively calculate/derive the motion plan based on the confidence measure. The robotic system 100 can calculate the motion plan that includes an approach location (e.g., the first approach location 432 of FIG. 4 and/or the second approach location 434 of FIG. 4), one or more scanning locations (e.g., the first presentation location 442 of FIG. 4 and/or the second presentation location 444 of FIG. 4), or a combination thereof according to the confidence measure. For example, the robotic system 100 can calculate the approach location and/or the scanning locations according to a metric (e.g., a performance metric and/or a scanning metric) based on an outcome of comparing the confidence measure to a sufficiency threshold. The scanning location can be for placing the end-effector so as to present one or more surfaces of the target object 112 before (i.e., in the scanning field of) one or more corresponding object scanners 416 that are to scan the one or more object identifiers 332.

At block 532, the robotic system 100 (via, e.g., the processors 202) can calculate a set of available approach locations. The available approach locations can correspond to open or non-occupied spaces about the start location 114 sufficient for placing the end-effector. As described further below, the robotic system 100 can place the end-effector at a selected approach location for contacting and gripping the target object 112 without disturbing other objects.

In some embodiments, for example, the robotic system 100 can calculate the set of available approach locations based on calculating separation distances between object outlines of the target object 112 and those of adjacent objects. The robotic system 100 can compare the separation distances to a predetermined set of distances that correspond to a physical size/shape of the end-effector and/or different orientations thereof. The robotic system can identify each of the available approach locations when the corresponding separation distances exceed the predetermined set of distances corresponding to the size of the end-effector.

At decision block 534, the robotic system 100 can compare the confidence measure to one or more sufficiency conditions (e.g., one or more thresholds) to determine whether or not they are satisfied. When the confidence measure satisfies the sufficiency condition (e.g., the confidence measure exceeds the required threshold), such as illustrated at block 536, the robotic system 100 can calculate the motion plan (e.g., the first motion plan 422) based on a performance metric. In some embodiments, when the confidence measure satisfies the sufficiency condition, the robotic system 100 can assume that the initial pose is correct and calculate the motion plan without considering a scanning metric that corresponds to a likelihood for scanning at least one object identifier and/or a possibility that the initial pose may be inaccurate.

As an illustrative example, in some embodiments, the robotic system 100 can calculate candidate plans at block 542. The candidate plans can each be an instance of a motion plan that corresponds to a unique combination of an available approach location and a scanning location (e.g., corresponding presentation location/orientation for the target object 112). In some embodiments, the robotic system 100 can calculate the identifier location(s) 334 according to the initial pose, such as by rotating the identifier location(s) 334 or a corresponding model/pose in the master data 252. The robotic system 100 can eliminate available approach locations that would have the end-effector cover (e.g., be directly over, in front of, and/or within a threshold distance from) the identifier location(s) 334.

The robotic system 100 can calculate a candidate plan for each remaining available approach location in the set (e.g., calculation result of block 532). For each candidate plan, the robotic system 100 can further calculate a unique scanning location according to the available approach location. In some embodiments, the robotic system 100 can calculate the scanning location based on rotating and/or translating a model of the target object 112, such that the surface corresponding to the identifier location 334 is in the scanning field and faces the corresponding object scanner. The robotic system 100 can rotate and/or translate the model according to a predetermined process, equation, function, etc.

At block 544, the robotic system 100 can calculate a performance metric for each candidate plan. The robotic system 100 can calculate the performance metric that corresponds to a throughput rate for completing the task 402. For example, the performance metric can be associated with a distance traversed by the target object 112, an estimated transfer duration, a number of commands and/or setting changes for the actuation devices 212, a completion rate (i.e., complementary to a piece-loss rate), or a combination thereof for the candidate plan. The robotic system 100 can calculate the corresponding values for the candidate motion plan using one or more measured or known data (e.g., acceleration/speed associated with settings/commands and/or piece-loss rate associated with a grip surface and/or a maneuver) and a predetermined calculation process, equation, function, etc.

At block 546, the robotic system 100 can select the candidate plan (i.e., along with the corresponding approach location) with the maximum performance metric as the motion plan. For example, the robotic system 100 can select as the motion plan the candidate plan that corresponds to the highest completion rate, the shortest travel distance, the lowest number of commands and/or setting changes, the fastest transfer duration, or a combination thereof among the set of candidate plans. Accordingly, the robotic system 100 can select the available approach location in the set that corresponds to the highest performance metric as the approach location.

Figure 5B:
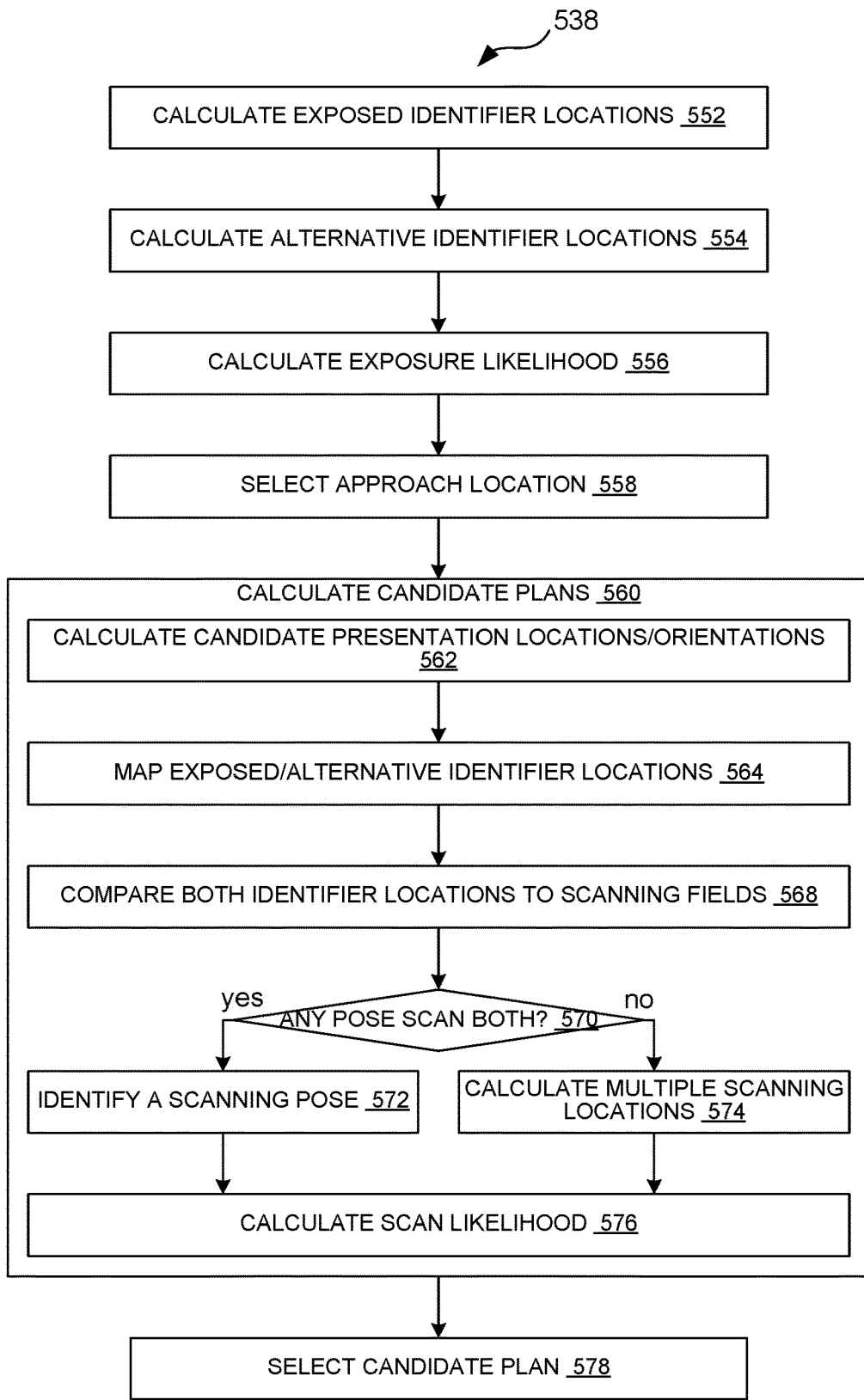
FIG. 5B is a flow diagram for deriving motion plans based on scanning metrics in accordance with one or more embodiments of the present disclosure.

In comparison, the robotic system 100 can calculate the candidate plan according to a different measure when the confidence measure fails to satisfy the sufficiency condition (e.g., the confidence measure is below the required threshold). In some embodiments, as illustrated at block 538, the robotic system 100 can calculate the motion plan (e.g., the second motion plan 424) based on a scanning metric. The scanning metric is a value (e.g., a binary value or a non-binary score/percentage) that corresponds to a likelihood that at least one of the object identifiers 332 remains uncovered by the end-effector and is scannable, regardless of whether the initial pose is accurate. In some embodiments, for example, the robotic system 100 can prioritize the scanning metric (e.g., satisfy first and/or give it a heavier weight) over the performance metrics when the confidence measure fails to satisfy the sufficiency condition. Accordingly, the robotic system 100 can calculate the motion plan that includes one or more scanning locations for presenting (i.e., in the scanning field and/or facing the corresponding scanner) the at least one uncovered object identifier before one or more of the object scanners. In illustrating the process in further detail, FIG. 5B is a flow diagram 538 for selectively calculating motion plans (e.g., one or more locations for the end-effector) based on scanning metrics in accordance with one or more embodiments of the present disclosure.

In some embodiments, calculating the motion plan based on a scanning metric can include calculating a set of exposed identifier locations as illustrated in block 552. The robotic system 100 can calculate the set of exposed identifier locations (e.g., the identifier locations 334 that can remain scannable with the end-effector in gripping position) relative to the initial pose. The robotic system 100 can calculate the exposed identifier locations for each available approach location. The exposed identifier location can correspond to locations of the object identifiers 332 that remain uncovered with the end-effector at the corresponding approach location according to a hypothesis that the initial pose is accurate.

As described above (for block 542), in some embodiments, the master data 252 can include a computer model or a template (e.g., offset measures relative to one or more object edges and/or images) that describes the identifier locations 334 for each of the expected objects. The robotic system 100 can calculate the set of exposed identifier locations based on rotating and/or translating the predetermined model/template in the master data 252 to match the initial pose. In some embodiments, the robotic system 100 can eliminate available approach locations that would have the end-effector cover (e.g., be directly over, in front of, and/or within a threshold distance from) the identifier locations 334. In other words, the robotic system 100 can eliminate the approach locations that are directly over, in front of, and/or within a threshold distance from the identifier locations 334.

At block 554, the robotic system 100 can calculate a set of alternative identifier locations. The robotic system 100 can calculate the set of the alternative identifier locations (e.g., the identifier locations 334) for poses alternative to the initial pose. For each available approach location, the robotic system 100 can calculate alternative poses, and for each alternative pose, the robotic system 100 can calculate the alternative identifier locations. As such, the alternative identifier locations can correspond to locations of the object identifiers 332 that remain uncovered with the end-effector at the corresponding approach location according to a hypothesis that the initial pose is inaccurate. As described above for the exposed identifier locations, the robotic system 100 can calculate the alternative identifier locations based on rotating and/or translating the predetermined model/template in the master data 252 according to the alternative pose.

At block 556, the robotic system 100 can calculate an exposure likelihood for each of the approach locations, each of the alternative poses, each of the object identifiers, or a combination thereof. The exposure likelihood represents a likelihood that one or more object identifiers would remain exposed and scannable with the end-effector gripping the target object 112 from the corresponding approach location. The exposure likelihood can represent both the scenario that the initial pose is accurate and the scenario that the initial pose is inaccurate. In other words, the exposure likelihood can represent the likelihood that one or more object identifiers would remain exposed and scannable even if the initial pose is inaccurate.

In some embodiments, for example, the robotic system 100 can calculate the exposure likelihood as a conditional probability, such as a probabilistic value corresponding to a particular condition (e.g., a unique instance of the approach location, the alternative pose, the object identifier, or a combination thereof). In some embodiments, the robotic system 100 can calculate the exposure likelihood based on combining (via, e.g., adding and/or multiplying) the conditional probability with a probability/likelihood that the particular condition is true (e.g., a value similar to the confidence measure). In some embodiments, the robotic system 100 can calculate the exposure likelihood based on adding the probabilities for each likely exposed identifier when multiple identifiers would be exposed for the considered approach location and/or the considered pose.

In some embodiments, the robotic system 100 can calculate the exposure likelihood based on combining the probabilistic values based on the exposed identifier locations and the alternative identifier locations, such as for each potential pose for a considered approach location. For example, the robotic system 100 can calculate the exposure likelihood using the probabilities for the exposed identifier locations and the alternative identifier locations with opposing signs (e.g., positive and negative). The robotic system 100 can calculate the exposure likelihood based on adding the magnitudes of the two probabilities and/or adding the probabilities with the signs. The overall magnitude can represent an overall likelihood that one or more object identifiers would remain scannable, and the signed/vectored likelihood can represent a likelihood that one or more object identifiers would remain scannable even if the initial pose was inaccurate. Accordingly, an approach position would be ideal when the overall magnitude is higher, and the signed/vectored likelihood is closer to zero, such as for representing similar chances that an object identifier would be scannable regardless of the accuracy for the initial pose.

At block 558, the robotic system 100 can select an approach location. In some embodiments, the robotic system 100 can select as the approach location the available approach location that includes uncovered identifier locations in both an exposed identifier set (e.g., a set of estimated locations of the object identifiers according to a hypothesis that the initial pose is correct) and an alternative identifier set (e.g., one or more sets of estimated locations of the object identifiers according to a hypothesis that the initial pose is incorrect). In other words, the robotic system 100 can select the approach location that would leave at least one object identifier exposed and scannable regardless of the accuracy of the initial pose. In some embodiments, the robotic system 100 can select as the approach location the available approach location that corresponds to the exposure likelihood matching and/or closest to a targeted condition, such as the highest overall magnitude and/or the signed/vectored likelihood that is closer to zero.

In some embodiments, the robotic system 100 can calculate a scan likelihood (e.g., a likelihood that an exposed object identifier would be successfully scanned) based on the exposure likelihood. For example, the robotic system 100 can combine the exposure likelihood with an evaluation value (e.g., a tracked rate of successful scans, a physical size, and/or an identifier type) associated with the corresponding exposed object identifier. The robotic system 100 can select as the approach location the available approach location that corresponds to the highest scan likelihood.

In some embodiments, the robotic system 100 can compare the exposed identifier set to the alternative identifier set to determine whether the exposed identifier set and the alternative identifier set include locations on opposing surfaces of the target object 112 (e.g., between the first pose 312 and the third pose 316). Accordingly, the robotic system 100 can select an available approach location that corresponds to a third surface (e.g., one of the object-peripheral surfaces 326) that is orthogonal to the two opposing surfaces.

At block 560, such as when the confidence measure fails to satisfy the sufficiency threshold, the robotic system 100 can calculate candidate motion plans based on the selected approach location. The robotic system 100 can calculate the candidate motion plans that include one or more scanning locations for the end-effector that correspond to one or more presentation locations/orientations that place the object identifiers in both the exposed identifier set and the alternative identifier set. In other words, the robotic system 100 can calculate the candidate motion plans that can scan the target object 112 regardless of the accuracy of the initial pose.

In some embodiments, the robotic system 100 can calculate the candidate motion plans that account for the identifier locations in both the exposed identifier set and the alternative identifier set. For example, the robotic system 100 can calculate the candidate motion plans that account for the possible identifier locations on opposing and/or orthogonal surfaces. Accordingly, the robotic system 100 can account for an opposing pose (e.g., a pose oriented in an opposite direction where the outline of the target object stays the same from a viewing location/angle) and/or other rotated poses in addition to the initial pose. Referring back to FIG. 3A and FIG. 3C as an illustrative example, the robotic system 100 can calculate the candidate motion plans that account for both the first pose 312 and the third pose 316 when the gripping location corresponds to one of the object-peripheral surfaces 326.

To account for multiple possible poses (e.g., erroneous estimation of the initial pose), the robotic system 100 can calculate a scanning pose that would place the object identifiers in both the exposed identifier set and the alternative identifier set. In some embodiments, as illustrated at block 562, the robotic system 100 can calculate a set of candidate poses for the target object 112 in or through the scanning fields. Given the selected approach location, the robotic system 100 can calculate candidate scanning locations as described above for block 542, such as by rotating and/or translating the identifier location model to place the identifier location 334 in the scanning field.

At block 564, the robotic system 100 can map the exposed identifier set and the alternative identifier set to each of the candidate scanning locations. The robotic system 100 can map the exposed identifier set based on rotating the identifier location model starting from the initial pose. The robotic system 100 can map the alternative identifier set based on rotating the identifier location model starting from one of the alternative poses (e.g., the opposing pose).

With the identifier locations mapped, at block 568, the robotic system 100 can compare a location and/or an orientation of the object identifiers in both the exposed identifier set and the alternative identifier set with the scanning fields. At decision block 570, the robotic system 100 can determine whether the candidate pose simultaneously presents the object identifiers in both the exposed identifier set and the alternative identifier set to the object scanners.

At block 572, the robotic system 100 can identify as the scanning pose the candidate poses that simultaneously present the object identifiers in both the exposed identifier set and the alternative identifier set to different object scanners/scanning fields. For example, when the gripping location corresponds to one of the object-peripheral surfaces 326 with the object locations in the exposed identifier set and the alternative identifier set being on opposing surfaces, the robotic system 100 can identify the scanning pose that places the target object 112 between a pair of opposing/facing object scanners with each of the opposing surfaces of the target object 112 facing the one of the object scanners.

At block 574, when none of the candidate poses simultaneously presents the object identifiers in both the exposed identifier set and the alternative identifier set, the robotic system 100 can calculate multiple scanning locations (e.g., a first scanning location and a second scanning location) that each present at least one object identifier from the exposed identifier set and the alternative identifier set. For example, the first scanning location can present one or more object identifier locations in the exposed identifier set to one of the object scanners, and the second scanning location can present one or more object identifier locations in the alternative identifier set to one of the object scanners. The second scanning location can be associated with rotating the end-effector about an axis, translating the end-effector, or a combination thereof from the first scanning location.

Referring back to the example illustrated in FIG. 4, the second motion plan 424 can correspond to the second approach location 434 that corresponds to the third surface (e.g., one of the object-peripheral surfaces 326) that is orthogonal to the two opposing surfaces (e.g., for the first pose 312 and the third pose 316) as described above. Accordingly, the first scanning location can correspond to a first one of the second presentation locations 444 that places a surface (e.g., estimated to be the object-bottom surface 324) corresponding to the initial pose (e.g., the first pose 312) above and facing an upward-facing object scanner 416. The second scanning location can correspond to a second one of the second presentation locations 444 that rotates the target object 112 90 degrees in a counter-clockwise direction relative to an overall transfer direction (e.g., generally from the start location 114 to the task location 116). Accordingly, the second scanning location can correspond to the second presentation location 444 that places a surface (e.g., estimated to be the object-bottom surface 324) corresponding to the alternative pose (e.g., the third pose 316) in a vertical orientation in front of and facing a horizontally facing object scanner 416.

According to the resulting scanning pose and/or the set of scanning locations, the robotic system 100 can calculate the candidate plans. The robotic system 100 can use one or more mechanisms described above (e.g., the A* mechanism) to calculate the candidate plans that place the end-effector at the selected approach location, contact and grip the target object 112 accordingly, and lift and transfer the target object 112 to the identified scanning pose and/or the set of scanning locations. For example, when the scanning pose is identified, the robotic system 100 can calculate the candidate plans to establish the scanning pose for the target object 112 in or through the scanning fields. When the robotic system 100 does not identify the scanning pose, the robotic system 100 can calculate the candidate plans to transfer/orient the end-effector sequentially through the set of multiple scanning locations, thereby sequentially transferring/rotating the target object 112 according to multiple presentation locations/orientations.

At block 576, the robotic system 100 can recalculate or update the scanning likelihood for each of the candidate motion plans. The robotic system 100 can update the scanning likelihood based on combining the various probabilities and/or preferences as described above for block 544 (e.g., probabilities and/or scores for the approach location, the scanning location, the utilized object scanner, the likely exposed identifier, an associated error and/or loss rate, or a combination thereof), but with respect to the scanning metric instead of the performance metrics.

At block 578, the robotic system 100 can calculate the motion plan based on selecting the candidate plan according to the scanning likelihood. The robotic system 100 can select the candidate plan that has maximum scanning likelihood among the candidate plans as the motion plan. For example, the robotic system 100 can select the candidate plan that has the highest likelihood of placing at least one of the exposed identifier locations and at least one of the alternative identifier locations in one or more of the scanning fields (i.e., before one or more of the object scanners) during the transfer of the target object 112 (e.g., for scanning in the air between the start location 114 and the task location 116).

When more than one candidate plan corresponds to scanning likelihoods within a relatively small difference value (e.g., a predetermined threshold), the robotic system 100 can calculate and evaluate (e.g., as described above for blocks 544 and 546) performance metrics corresponding to the corresponding candidate plans. The robotic system 100 can select the candidate plan that is closest to the targeted condition as the motion plan.

In some embodiments, the robotic system 100 can deviate from the illustrated example flow. For example, the robotic system 100 can select the approach location as described above. Based on the selected approach location, the robotic system 100 can grip the target object 112 and implement a predetermined set of maneuvers, such as to lift, reorient, horizontally translate, place back down and release, or a combination thereof. During or after the predetermined set of maneuvers, the robotic system 100 can re-image or scan the pickup area (via, e.g., looping back to block 502) and redetermine the initial pose and the confidence measure (via, e.g., blocks 522 and 524).

Returning back to FIG. 5A, at block 508, the robotic system 100 can begin implementing the resulting motion plan. The robotic system 100 can implement the motion plan based on operating the one or more processors 202 to send the commands and/or settings of the motion plan to other devices (e.g., the corresponding actuation devices 212 and/or other processors) to execute the task 402. Accordingly, the robotic system 100 can execute the motion plan by operating the actuation devices 212 according to the sequence of commands or settings or combination thereof. For example, the robotic system 100 can operate the actuation devices 212 to place the end-effector at the approach location about the start location 114, contact and grip the target object 112, or a combination thereof.

At block 582, the robotic system 100 can transfer the end-effector to the scanning location, thereby transferring the target object 112 to the presentation location/orientation. For example, after or along with lifting the target object 112 from the start location 114, the robotic system 100 can transfer the end-effector to establish the scanning pose for the target object 112. Also, the robotic system 100 can transfer the end-effector to the first scanning location.

At block 584, the robotic system 100 can operate the object scanners 416 to scan the target object 112. For example, one or more of the processors 202 can send a command to the object scanners 416 to perform a scan and/or send a query to the object scanners 416 to receive a scan status and/or a scanned value. When the motion plan includes the scanning pose, such as at block 585, the robotic system 100 can implement the motion plan to transfer the target object 112 in the scanning pose across the scanning fields in a direction orthogonal to orientations of the scanning fields. While the target object 112 is transferred, the object scanners 416 can (simultaneously and/or sequentially) scan multiple surfaces for multiple possible locations of the object identifier 332.

At decision block 586, the robotic system 100 can evaluate the scanning result (e.g., status and/or the scanned value) to determine whether the target object 112 was scanned. For example, the robotic system 100 can verify the scanning result after implementing the motion plan up to the first scanning location. When the scanning result indicates a successful scan (e.g., the status corresponding to detection of a valid code/identifier and/or the scanned value matching the identified/expected object) of the target object 112, such as at block 588, the robotic system 100 can transfer the target object 112 to the task location 116. In some embodiments, based on the successful scan, the robotic system 100 can ignore any subsequent scanning location (e.g., the second scanning location) and directly transfer the target object 112 to the task location 116.

When the scanning result indicates an unsuccessful scan, the robotic system 100 can determine at decision block 590 whether the current scanning location is the last one in the motion plan. When it is not the last motion plan, the robotic system 100 can transfer the target object 112 to the next presentation location/orientation as represented by a loop back to block 582.

When the current scanning location is the last one in the motion plan, the robotic system 100 can implement one or more remedial actions as illustrated at block 592. In some embodiments, the robotic system 100 can halt and/or cancel the motion plan when the scanning results for all of the scanning locations in the motion plan indicate failed scans. In some embodiments, the robotic system 100 can generate an error status/message for notifying an operator. In some embodiments, the robotic system 100 can place the target object 112 inside of an area (i.e., at a location different from the start location 114 and the task location 116) designated for objects that failed to be scanned.

Based on either successfully completing the task 402 (i.e., successfully scanning the target object 112 and placing it at the task location 116) or implementing the remedial actions, the robotic system 100 can move on to the next task/object.

In some embodiments, the robotic system 100 can rescan the designated areas, as illustrated by a loop back to block 502. In some embodiments, the robotic system 100 can use the existing imaging data to select the next object as the target object 112, as illustrated by a loop back to block 504.

Scanning the target object 112 in the air (e.g., at a location between the start location 114 and the task location 116) provides improved efficiency and speed for performing the task 402. By calculating the motion plan that includes the scanning locations and also coordinates with the object scanners 416, the robotic system 100 can effectively combine the task for transferring the target object with the task for scanning the target object. Moreover, calculating the motion plan according to the confidence measure of the initial orientation further improves efficiency, speed, and accuracy for the scanning task. As described above, the robotic system 100 can calculate the motion plan that accounts for alternative orientations that correspond to the scenario of the initial pose being inaccurate. Accordingly, the robotic system 100 can increase the likelihood of accurately/successfully scanning the target object even with pose determination errors, such as due to calibration errors, unexpected poses, unexpected lighting conditions, etc. The increased likelihood in accurate scans can lead to increased overall throughput for the robotic system 100 and further reduce operator efforts/interventions.

CONCLUSION

The above Detailed Description of examples of the present disclosure is not intended to be exhaustive or to limit the present disclosure to the precise form disclosed above. While specific examples for the present disclosure are described above for illustrative purposes, various equivalent modifications are possible within the scope of the present disclosure, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples; alternative implementations may employ differing values or ranges.

These and other changes can be made to the present disclosure in light of the above Detailed Description. While the Detailed Description describes certain examples of the present disclosure as well as the best mode contemplated, the present disclosure can be practiced in many ways, no matter how detailed the above description appears in text. Details of the system may vary considerably in its specific implementation, while still being encompassed by the present disclosure. As noted above, particular terminology used when describing certain features or aspects of the present disclosure should not be taken to imply that the terminology is being redefined herein to be restricted to any specific characteristics, features, or aspects of the present disclosure with which that terminology is associated. Accordingly, the invention is not limited, except as by the appended claims. In general, the terms used in the following claims should not be construed to limit the present disclosure to the specific examples disclosed in the specification, unless the above Detailed Description section explicitly defines such terms.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

I claim:

1. A method for operating a robotic system, the method comprising:
   receiving imaging data representing a pickup area including a target object;
   determining an initial pose of the target object based on the imaging data, wherein determining the initial pose includes:
   identifying a set of edges of an exposed surface of the target object in the imaging data,
   estimating physical dimensions of the target object based on measuring the edges in the set and mapping the measurements into standard lengths, and
   matching the estimated physical dimensions of the exposed surface to a set of known dimensions of object surfaces in master data;
   calculating a confidence measure associated with the initial pose, wherein the confidence measure is indicative of a likelihood of the initial pose being accurate;
   deriving, based on the confidence measure, an approach location and at least one scanning location, the approach location defining a location for an end-effector of a robotic arm to contact and grip the target object, the scanning location defining a location for the end-effector to present one or more surfaces of the target object before one or more corresponding object scanners so as to scan one or more object identifiers;
   deriving, based on the derived approached location and the scanning location, a motion plan, wherein the motion plan includes commands, settings, or a combination thereof, for operating the robotic arm and the end-effector to execute a task based on (1) picking up the target object from a start location, (2) transferring the target object to a task location, and (3) presenting one or more object identifiers to one or more object scanners located between the start location and the task location; and
   implementing the motion plan for operating one or more actuation devices to execute the task;
   wherein deriving the approach location and the at least one scanning location and deriving the motion plan include:
   comparing the confidence measure to a sufficiency threshold;
   based on an outcome of the comparison, selectively calculating the approach location and the scanning location according to a performance metric and/or a scanning metric, wherein the scanning metric corresponds to a likelihood of at least one of the object identifiers remaining uncovered by the end-effector regardless of whether or not the initial pose is accurate;
   identifying a pair of opposing surfaces matching the estimated physical dimensions; and
   when the confidence measure fails to satisfy the sufficiency threshold, calculating the motion plan that accounts for an opposing pose in addition to the initial pose, wherein the opposing pose and the initial pose correspond to the pair of opposing surfaces.

2. The method of claim 1, wherein deriving the approach location and the scanning location includes deriving the approach location and the scanning location according to the scanning metric when the confidence measure fails to satisfy the sufficiency threshold.

3. The method of claim 1, wherein deriving the approach location and the scanning location includes prioritizing the scanning metric before the performance metric when the confidence measure fails to satisfy the sufficiency threshold.

4. The method of claim 1, wherein deriving the approach location and the scanning location includes deriving the approach location and the scanning location based on the performance metric when the confidence measure satisfies the sufficiency threshold.

5. The method of claim 1, wherein deriving the approach location and the scanning location includes:
    calculating a set of available approach locations about the start location for the target object, wherein the set of available approach locations for placing the end-effector to contact and grip the target object without disturbing other objects;
    calculating an exposed identifier set for each available approach location in the set of available approach locations, wherein the exposed identifier set represents corresponding locations of the object identifiers remaining uncovered with the end-effector at the corresponding approach location according to a first hypothesis of the initial pose being accurate;
    calculating an alternative identifier set for each available approach location in the set of available approach locations, wherein the alternative identifier set represents locations of the object identifiers remaining uncovered with the end-effector at the corresponding approach location according to a second hypothesis of the initial pose being inaccurate; and
    selecting the approach location, wherein the approach location is the available approach location having uncovered object identifiers in both the exposed identifier set and the alternative identifier set.

6. The method of claim 5, further comprising:
    identifying scanning fields corresponding to the object scanners;
    calculating a set of candidate poses for the target object in or through the scanning fields, wherein each candidate pose presents multiple surfaces of the target object to the object scanners;
    mapping the exposed identifier set and the alternative identifier set to each of the candidate poses;
    comparing the exposed identifier set and the alternative identifier set for each candidate pose to the scanning fields;
    identifying a scanning pose as a candidate pose presenting the object identifiers in the exposed identifier set and the alternative identifier set to the scanning fields; and
    wherein deriving the motion plan includes:
    deriving the motion plan establishing the scanning pose in or through the scanning fields.

7. The method of claim 6, wherein:
    identifying scanning fields includes identifying scanning fields oriented in opposite directions, orthogonal directions, or a combination thereof for scanning different surfaces of the target object in one pose; and
    implementing the motion plan includes implementing the motion plan for transferring the target object in the scanning pose across the scanning fields in a direction orthogonal to orientations of the scanning fields.

8. The method of claim 5, wherein deriving the motion plan includes calculating at least a first scanning location and a second scanning location, wherein the first scanning location is for presenting a location in the exposed identifier set to one of the object scanners and the second scanning location is for presenting a location in the alternative identifier set to one of the object scanners.

9. The method of claim 8, wherein implementing the motion plan includes:
    verifying a scanning result after implementing the motion plan up to the first scanning location; and
    transferring the target object to the task location and ignoring the second scanning location when the scanning result represents a successful scan.

10. The method of claim 8, wherein implementing the motion plan includes:
    verifying a scanning result after implementing the motion plan up to the first scanning location; and
    transferring the target object to the second scanning location when the scanning result represents a failed scan.

11. The method of claim 5, further comprising:
    comparing the exposed identifier set to the alternative identifier set to determine whether the exposed identifier set and the alternative identifier set include locations on opposing surfaces of the target object; and
    selecting the approach location associated with a third surface orthogonal to the opposing surfaces.

12. The method of claim 11, wherein deriving the approach location and the scanning location includes deriving the approach location and the scanning location without considering the scanning metric when the confidence measure satisfies the sufficiency threshold.

13. The method of claim 1, wherein deriving the approach location and the scanning location and deriving the motion plan include:
    calculating a set of available approach locations about the start location for the target object, wherein the set of available approach locations represents positions for placing the end-effector to grip the target object without disturbing other objects;
    calculating a candidate plan for each available approach location in the set of available approach locations, wherein the candidate plan includes a candidate scanning location;
    calculating the performance metric for each candidate plan, wherein the performance metric corresponds to a throughput rate associated with a distance traversed by the target object, an estimated transfer duration, a number of commands or setting changes, a completion rate associated with the corresponding available approach location, or a combination thereof for placing the target object at the task location; and
    selecting the approach location, wherein the approach location is an available approach location in the set corresponding to the highest performance metric.

14. The method of claim 1, wherein determining the initial pose further includes:
    determining the initial pose based on identifying an exposed surface, an orientation of the exposed surface, or a combination thereof using a visible mark on the exposed surface; and
    matching the visible mark to a set of known marks on object surfaces in master data.

15. The method of claim 1, wherein:
implementing the motion plan includes determining a scanning result; and further comprising:
halting the motion plan when the scanning result indicates a failed scan; and
implementing a failure resolution for notifying an operator, for placing the target object at a location different from the start location and the task location, or a combination thereof.

16. A tangible, non-transitory computer-readable medium having processor instructions stored thereon that, when executed by a robotic system, cause the robotic system to perform a method comprising:
receiving imaging data representing a pickup area including a target object;
determining an initial pose of the target object based on the imaging data, wherein determining the initial pose includes:
identifying a set of edges of an exposed surface of the target object in the imaging data,
estimating physical dimensions of the target object based on measuring the edges in the set and mapping the measurements into standard lengths, and
matching the estimated physical dimensions of the exposed surface to a set of known dimensions of object surfaces in master data;
calculating a confidence measure associated with the initial pose, wherein the confidence measure is indicative of a likelihood of the initial pose being accurate;
deriving, based on the confidence measure, an approach location and at least one scanning location, the approach location defining a location for the end-effector to contact and grip the target object, the scanning location defining a location for the end-effector to present one or more surfaces of the target object before one or more corresponding object scanners so as to scan the one or more object identifiers;
deriving, based on the derived approached location and the scanning location, a motion plan, wherein the motion plan includes commands, settings, or a combination thereof, for operating the robotic arm and the end-effector to execute a task based on (1) picking up the target object from a start location, (2) transferring the target object to a task location, and (3) presenting the one or more object identifiers to the one or more object scanners located between the start location and the task location; and
implementing the motion plan for operating one or more actuation devices to execute the task;
wherein deriving the approach location and the at least one scanning location and deriving the motion plan include:
comparing the confidence measure to a sufficiency threshold,
based on an outcome of the comparison, selectively calculating the approach location and the scanning location according to a performance metric and/or a scanning metric, wherein the scanning metric corresponds to a likelihood of at least one of the object identifiers remaining uncovered by the end-effector regardless of whether or not the initial pose is accurate;
identifying a pair of opposing surfaces matching the estimated physical dimensions; and
when the confidence measure fails to satisfy the sufficiency threshold, calculating the motion plan that accounts for an opposing pose in addition to the initial pose, wherein the opposing pose and the initial pose correspond to the pair of opposing surfaces.

17. The tangible, non-transitory computer-readable medium of claim 16, wherein deriving the approach location and the scanning location includes deriving the approach location and the scanning location according to the scanning metric when the confidence measure fails to satisfy the sufficiency threshold.

18. The tangible, non-transitory computer-readable medium of claim 16, wherein deriving the approach location and the scanning location includes deriving the approach location and the scanning location based on the performance metric when the confidence measure satisfies the sufficiency threshold.

19. A robotic system comprising:
at least one processor; and
at least one memory device operably coupled to the processor and having stored thereon instructions executable by the processor to:
receive imaging data representing a pickup area including a target object;
determine an initial pose of the target object based on the imaging data, wherein determining the initial pose includes:
identify a set of edges of an exposed surface of the target object in the imaging data,
estimate physical dimensions of the target object based on measuring the edges in the set and mapping the measurements into standard lengths, and
matching the estimated physical dimensions of the exposed surface to a set of known dimensions of object surfaces in master data;
calculate a confidence measure associated with the initial pose, wherein the confidence measure is indicative of a likelihood of the initial pose being accurate;
derive, based on the confidence measure, an approach location and at least one scanning location, the approach location defining a location for an end-effector of a robotic arm to contact and grip the target object, the scanning location defining a location for the end-effector to present one or more surfaces of the target object before one or more corresponding object scanners so as to scan one or more object identifiers;
derive, based on the derived approached location and the scanning location, a motion plan, wherein the motion plan includes commands, settings, or a combination thereof, for operating the robotic arm and the end-effector to execute a task based on (1) picking up the target object from a start location, (2) transferring the target object to a task location, and (3) presenting the one or more object identifiers to the one or more object scanners located between the start location and the task location; and
implement the motion plan for operating one or more actuation devices to execute the task;
wherein deriving the approach location and the at least one scanning location and deriving the motion plan include:
comparing the confidence measure to a sufficiency threshold;
based on an outcome of the comparison, selectively calculating the approach location and the scanning location according to a performance metric and/or a scanning metric, wherein the scanning metric corresponds to a likelihood of at least one of the object identifiers remaining uncovered by the end-effector regardless of whether or not the initial pose is accurate;

identifying a pair of opposing surfaces matching the estimated physical dimensions; and when the confidence measure fails to satisfy the sufficiency threshold, calculating the motion plan that accounts for an opposing pose in addition to the initial pose, wherein the opposing pose and the initial pose correspond to the pair of opposing surfaces.

20. The robotic system of claim 19 wherein the memory device includes instructions executable by the processor to:

calculate a set of available approach locations about the start location for the target object, wherein the set of available approach locations for placing the end-effector to contact and grip the target object without disturbing other objects;

calculate an exposed identifier set for each available approach location in the set of available approach locations, wherein the exposed identifier set represents corresponding locations of the object identifiers remaining uncovered with the end-effector at the corresponding approach location according to a first hypothesis of the initial pose being accurate;

calculate an alternative identifier set for each available approach location in the set of available approach locations, wherein the alternative identifier set represents locations of the object identifiers remaining uncovered with the end-effector at the corresponding approach location according to a second hypothesis of the initial pose being inaccurate; and select as the approach location the available approach location having uncovered object identifiers in both the exposed identifier set and the alternative identifier set.

* * * * *